US010564721B2

(12) United States Patent
Cruz-Hernandez et al.

(10) Patent No.: US 10,564,721 B2
(45) Date of Patent: Feb. 18, 2020

(54) SYSTEMS AND METHODS FOR USING MULTIPLE ACTUATORS TO REALIZE TEXTURES

(75) Inventors: Juan Manuel Cruz-Hernandez, Montreal (CA); Danny A Grant, Laval (CA)

(73) Assignee: Immersion Corporation, San Jose, CA (US)

(*) Notice: Subject to any disclaimer, the term of this patent is extended or adjusted under 35 U.S.C. 154(b) by 1057 days.

(21) Appl. No.: 12/697,042

(22) Filed: Jan. 29, 2010

(65) Prior Publication Data

US 2010/0231508 A1 Sep. 16, 2010

Related U.S. Application Data

(60) Provisional application No. 61/262,041, filed on Nov. 17, 2009, provisional application No. 61/262,038, (Continued)

(51) Int. Cl.
*G06F 3/01* (2006.01)
*G06T 15/04* (2011.01)
(Continued)

(52) U.S. Cl.
CPC ............ *G06F 3/016* (2013.01); *G06F 3/017* (2013.01); *G06F 3/0488* (2013.01); *G06T 15/04* (2013.01);
(Continued)

(58) Field of Classification Search
CPC ............... G06F 3/016; G06F 2203/013; A63F 2300/1037; H01H 2003/008
See application file for complete search history.

(56) References Cited

U.S. PATENT DOCUMENTS

| 5,144,187 A | 9/1992 | Culp |
| 5,198,732 A | 3/1993 | Morimoto |

(Continued)

FOREIGN PATENT DOCUMENTS

| CN | 1496549 | 5/2004 |
| CN | 1646833 | 7/2005 |

(Continued)

OTHER PUBLICATIONS

Biet, M. et al., "Discrimination of Virtual Square Gratings by Dynamic Touch on Friction Based Tactile Displays," Haptic Interfaces for Virtual Environment and Teleoperator Systems, 2008, Symposium, IEEE, Piscataway, NJ, XP 031339918, pp. 41-48, Mar. 2008.

(Continued)

*Primary Examiner* — James J Yang
(74) *Attorney, Agent, or Firm* — Kilpatrick Townsend & Stockton LLP

(57) ABSTRACT

Systems and methods for using multiple actuators to realize textures are disclosed. For example, one disclosed system includes, a system including: a first actuator configured to receive a first haptic signal and output a first haptic effect based at least in part on the first haptic signal; a second actuator configured to receive a second haptic signal and output a second haptic effect based at least in part on the second haptic signal; and a processor configured to: determine the first haptic effect and the second haptic effect, the first and second haptic effects configured when combined to output a texture; and transmit the first haptic signal to the first actuator and transmit the second haptic signal to the second actuator.

29 Claims, 6 Drawing Sheets

Related U.S. Application Data filed on Nov. 17, 2009, provisional application No. 61/159,482, filed on Mar. 12, 2009.

(51) Int. Cl.
  *G06F 3/0488* (2013.01)
  *G08B 6/00* (2006.01)
  *G06F 3/0346* (2013.01)

(52) U.S. Cl.
  CPC .... *G06F 3/0346* (2013.01); *G06F 2200/1637* (2013.01); *G06F 2203/014* (2013.01); *G08B 6/00* (2013.01)

(56) References Cited

U.S. PATENT DOCUMENTS

| | | |
|---|---|---|
| 5,691,898 A | 11/1997 | Rosenberg et al. |
| 5,709,219 A | 1/1998 | Chen et al. |
| 5,734,373 A | 3/1998 | Rosenberg et al. |
| 5,767,839 A | 6/1998 | Rosenberg |
| 5,844,392 A | 12/1998 | Peurach et al. |
| 5,952,806 A | 9/1999 | Muramatsu |
| 5,956,484 A | 9/1999 | Rosenberg et al. |
| 5,959,613 A | 9/1999 | Rosenberg et al. |
| 6,028,593 A | 2/2000 | Rosenberg et al. |
| 6,046,527 A | 4/2000 | Roopnarine et al. |
| 6,046,730 A | 4/2000 | Bowen et al. |
| 6,084,587 A | 7/2000 | Tarr et al. |
| 6,088,019 A | 7/2000 | Rosenberg |
| 6,131,097 A | 10/2000 | Peurach et al. |
| 6,147,674 A | 11/2000 | Rosenberg et al. |
| 6,169,540 B1 | 1/2001 | Rosenberg et al. |
| 6,219,032 B1 | 4/2001 | Rosenberg |
| 6,252,579 B1 | 6/2001 | Rosenberg |
| 6,285,351 B1 | 9/2001 | Rosenberg et al. |
| 6,292,170 B1 | 9/2001 | Chang et al. |
| 6,433,711 B1 | 3/2002 | Chen |
| 6,429,846 B2 | 8/2002 | Rosenberg et al. |
| 6,697,086 B2 | 2/2004 | Rosenberg et al. |
| 6,703,924 B2 | 3/2004 | Tecu et al. |
| 6,850,222 B1 | 2/2005 | Rosenberg |
| 6,859,819 B1 | 2/2005 | Rosenberg et al. |
| 7,027,032 B2 | 4/2006 | Rosenberg et al. |
| 7,109,967 B2 | 9/2006 | Hioki et al. |
| 7,148,875 B2 | 12/2006 | Rosenberg et al. |
| 7,516,406 B1 | 4/2009 | Cameron |
| 7,812,828 B2 | 10/2010 | Westerman et al. |
| 7,815,436 B2 | 10/2010 | Cunningham et al. |
| 7,843,438 B2 | 11/2010 | Onoda |
| 7,920,124 B2 | 4/2011 | Tokita et al. |
| 8,004,498 B1 | 8/2011 | Meridian |
| 8,018,431 B1 | 9/2011 | Zehr et al. |
| 8,122,354 B1 | 2/2012 | Torgerson |
| 8,210,942 B2 | 7/2012 | Shimabukuro et al. |
| 8,264,465 B2 | 9/2012 | Grant et al. |
| 8,294,557 B1 | 10/2012 | El Saddik et al. |
| 8,494,860 B2 | 7/2013 | Asakawa et al. |
| 8,677,274 B2 | 3/2014 | Runov et al. |
| 8,704,776 B2 | 4/2014 | Kim |
| 9,696,803 B2 | 7/2017 | Cruz-Hernandez et al. |
| 2001/0035854 A1 | 11/2001 | Rosenberg et al. |
| 2002/0033795 A1 | 3/2002 | Shahoian et al. |
| 2002/0149561 A1 | 10/2002 | Fukumoto et al. |
| 2002/0177471 A1 | 11/2002 | Kaaresoja et al. |
| 2003/0063128 A1 | 4/2003 | Salminaa et al. |
| 2003/0184518 A1 | 10/2003 | Numata et al. |
| 2004/0107407 A1 | 6/2004 | Henson et al. |
| 2004/0169674 A1 | 9/2004 | Linjama |
| 2004/0218910 A1 | 11/2004 | Chang et al. |
| 2004/0233162 A1 | 11/2004 | Kobayashi |
| 2005/0017947 A1* | 1/2005 | Shahoian .............. G06F 1/1616 345/156 |
| 2005/0030292 A1 | 2/2005 | Diederiks |
| 2005/0057526 A1 | 3/2005 | Kinoshita et al. |
| 2005/0057528 A1 | 3/2005 | Kleen |
| 2006/0046031 A1 | 3/2006 | Janevski |
| 2006/0061545 A1 | 3/2006 | Hughes et al. |
| 2006/0061558 A1 | 3/2006 | Grant et al. |
| 2006/0066560 A1 | 3/2006 | Gally et al. |
| 2006/0101347 A1 | 5/2006 | Runov et al. |
| 2006/0106767 A1 | 5/2006 | Adcock et al. |
| 2006/0119573 A1 | 6/2006 | Grant et al. |
| 2006/0119586 A1 | 6/2006 | Grant et al. |
| 2006/0181510 A1 | 8/2006 | Faith |
| 2006/0209037 A1 | 9/2006 | Wang et al. |
| 2006/0226298 A1 | 10/2006 | Pierson |
| 2006/0267416 A1 | 11/2006 | Suzuki |
| 2006/0290662 A1* | 12/2006 | Houston ................ A63F 13/06 345/156 |
| 2007/0021961 A1 | 1/2007 | Oh |
| 2007/0066283 A1 | 3/2007 | Haar et al. |
| 2007/0152974 A1 | 7/2007 | Kim et al. |
| 2007/0236450 A1 | 10/2007 | Colgate et al. |
| 2007/0236474 A1 | 10/2007 | Ramstein |
| 2007/0279401 A1 | 12/2007 | Ramstein et al. |
| 2007/0290988 A1 | 12/2007 | Nogami et al. |
| 2008/0048974 A1 | 2/2008 | Braun et al. |
| 2008/0068348 A1 | 3/2008 | Rosenberg et al. |
| 2008/0068648 A1 | 3/2008 | Benz et al. |
| 2008/0216578 A1 | 9/2008 | Takashima et al. |
| 2008/0218488 A1 | 9/2008 | Yang et al. |
| 2008/0226134 A1 | 9/2008 | Stetten et al. |
| 2009/0046054 A1 | 2/2009 | Olien |
| 2009/0053683 A1 | 2/2009 | Brown et al. |
| 2009/0063472 A1 | 3/2009 | Pell et al. |
| 2009/0079296 A1 | 3/2009 | Takahashi |
| 2009/0102805 A1 | 4/2009 | Meijer et al. |
| 2009/0106655 A1 | 4/2009 | Grant et al. |
| 2009/0112572 A1 | 4/2009 | Thorn |
| 2009/0134744 A1 | 5/2009 | Yoon et al. |
| 2009/0135142 A1 | 5/2009 | Fu et al. |
| 2009/0167701 A1 | 7/2009 | Ronkainen |
| 2009/0178008 A1 | 7/2009 | Herz et al. |
| 2009/0207129 A1 | 8/2009 | Ullrich et al. |
| 2009/0227296 A1 | 9/2009 | Kim |
| 2009/0284485 A1 | 11/2009 | Colgate et al. |
| 2010/0013653 A1 | 1/2010 | Birnbaum et al. |
| 2010/0020036 A1 | 1/2010 | Hui et al. |
| 2010/0026976 A1 | 2/2010 | Meehan et al. |
| 2010/0073304 A1 | 3/2010 | Grant et al. |
| 2010/0079264 A1 | 4/2010 | Hoellwarth |
| 2010/0108408 A1 | 5/2010 | Colgate et al. |
| 2010/0123597 A1 | 5/2010 | Kitsakawa |
| 2010/0128002 A1 | 5/2010 | Stacy et al. |
| 2010/0145934 A1 | 6/2010 | Tran et al. |
| 2010/0188327 A1 | 7/2010 | Frid et al. |
| 2010/0223133 A1 | 9/2010 | Scott et al. |
| 2010/0231539 A1 | 9/2010 | Cruz-Hernandez et al. |
| 2010/0315212 A1 | 12/2010 | Radivojevic |
| 2011/0115709 A1 | 5/2011 | Cruz-Hernandez |
| 2011/0157088 A1 | 6/2011 | Motomura et al. |
| 2011/0248817 A1 | 10/2011 | Houston et al. |
| 2011/0287986 A1 | 11/2011 | Mordukhovich et al. |
| 2012/0154133 A1 | 6/2012 | Kyung et al. |
| 2012/0182248 A1 | 7/2012 | Kobayashi et al. |
| 2012/0232780 A1* | 9/2012 | Delson .................... A63F 13/06 701/400 |
| 2014/0317200 A1 | 10/2014 | Lucero et al. |
| 2014/0317503 A1 | 10/2014 | Lucero et al. |
| 2015/0253848 A1 | 9/2015 | Heubel et al. |
| 2018/0052556 A1 | 2/2018 | Levesque et al. |

FOREIGN PATENT DOCUMENTS

| | | |
|---|---|---|
| CN | 101467118 | 6/2009 |
| CN | 101506758 | 8/2009 |
| CN | 101523329 | 9/2009 |
| CN | 101616213 | 12/2009 |
| CN | 105353877 | 2/2016 |
| EP | 0899 650 | 3/1999 |
| EP | 1 401 185 | 3/2004 |
| EP | 1 731 993 | 12/2006 |
| EP | 1748350 | 1/2007 |
| EP | 2406700 | 1/2012 |

(56) References Cited

FOREIGN PATENT DOCUMENTS

| | | |
|---|---|---|
| EP | 2406702 | 1/2012 |
| GB | 2 416 962 | 2/2006 |
| JP | 087182 | 1/1996 |
| JP | 11-212725 | 8/1999 |
| JP | 2001255993 | 9/2001 |
| JP | 2002149312 | 5/2002 |
| JP | 2003067135 | 3/2003 |
| JP | 2003091233 | 3/2003 |
| JP | 2003099177 | 4/2003 |
| JP | 2004046792 | 2/2004 |
| JP | 2004-265281 | 9/2004 |
| JP | 2005071157 | 3/2005 |
| JP | 2005077674 | 3/2005 |
| JP | 2005-258666 | 9/2005 |
| JP | 2006079238 | 3/2006 |
| JP | 2006509289 | 3/2006 |
| JP | 2006157642 | 6/2006 |
| JP | 2006163206 | 6/2006 |
| JP | 2006-228151 | 8/2006 |
| JP | 2006268068 | 10/2006 |
| JP | 2007133698 | 5/2007 |
| JP | 2007531113 | 11/2007 |
| JP | 2008515002 | 5/2008 |
| JP | 2008516348 | 5/2008 |
| JP | 2008520012 | 6/2008 |
| JP | 2008225690 | 9/2008 |
| JP | 2009-003867 | 1/2009 |
| JP | 2010515153 | 5/2010 |
| JP | 2016201119 | 12/2016 |
| KR | 1020010108361 | 12/2001 |
| KR | 10-2002-0037771 | 4/2005 |
| KR | 1020060053012 | 5/2006 |
| KR | 1020090024006 | 3/2009 |
| KR | 20160104748 | 9/2016 |
| WO | WO 2001/054109 | 7/2001 |
| WO | WO 2002/073587 | 9/2002 |
| WO | WO 2004/044728 | 5/2004 |
| WO | WO 2004/051451 | 6/2004 |
| WO | WO 2004/075169 | 9/2004 |
| WO | WO 2005/103863 | 11/2005 |
| WO | WO 2006/042309 | 4/2006 |
| WO | 2007059172 | 5/2007 |
| WO | 2007091053 | 8/2007 |
| WO | WO 2007/120562 | 10/2007 |
| WO | WO 2007117418 | 10/2007 |
| WO | WO 2008/037275 | 4/2008 |
| WO | WO 2008/042745 | 4/2008 |
| WO | 2008085487 | 7/2008 |
| WO | WO 2008/103535 | 8/2008 |
| WO | WO 2008/132540 | 11/2008 |
| WO | WO 2008/144108 | 11/2008 |
| WO | 2008147622 | 12/2008 |
| WO | WO 2009/002605 | 12/2008 |
| WO | WO 2009/026337 | 2/2009 |
| WO | 2009042424 | 4/2009 |
| WO | WO 2009/074185 | 6/2009 |

OTHER PUBLICATIONS

De Witt, A., "Designing Sonification of User Data in Affective Interaction," Master of Science Thesis Stockholm, Sweden, XP 002551466, at hppt://w3.nada.kth.se/utbildning/grukth/exjobb/rapportlistor/2007/de_witt_anna_07142, as available via the Internet and printed Oct. 20, 2009.

Kaaresoja, T. et al., "Snap-Crackle-Pop: Tactile Feedback for Mobile Touch Screens," Proceedings of the Eurohaptics 2006, XP002551465, at http://lsc.univ-evry.fr/(eurohaptics/upload/cd/papers/f80, as available via the Internet and printed Oct. 20, 2009.

Maeno, T. et al., "Tactile Display of Surface Texture by use of Amplitude Modulation of Ultrasonic Vibration," IEEE Ultrasonics Symposium, 2006, pp. 62-65.

Minsky, Margaret Diane Rezvan, "Computational Haptics: The Sandpaper System for Synthesizing Texture for a Force-Feedback Display," Ph.D. Dissertation, Massachusetts Institute of Technology, Jun. 1995, 217 pages.

Oakley, I. et al., Contact IM: Exploring Asynchronous Touch over Distance, Palpable Machines Research Group, Media Lab Europe, XP007910188, at http://people.cs.vt.edu/[wangr06/touch%20review%origization/OAK002, as available via the Internet and printed Oct. 20, 2009.

Rovers, A. et al., HIM: A Framework for Haptic Instant Messaging, CHI 2004 (CHI Conference Proceedings, Human Factors in Computing Systems), XP 002464573, Vienna Austria, Apr. 2004, p. 1313-1316.

Sekiguchi, Y. et al., "Haptic Interface using Estimation of Box Contents Metaphor," Proceedings of ICAT 2003, Tokyo, Japan, XP 002551467, at http://www.vrsj.org/ic-at/papers/2003/00947_00000, as available via the Internet and printed Oct. 20, 2009.

Watanabe, T. et al., "A Method for Controlling Tactile Sensation of Surface Roughness Using Ultrasonic Vibration," IEEE International Conference on Robotics and Automation, 0-7803-1965-6/95, 1995, pp. 1134-1139.

Williamson, J. et al., "Shoogle: Excitatory Multimodal Interaction on Mobile Devices," CHI 2007 Proceedings—Shake, Rattle and Roll: New Forms of Input and Output, 2007, pp. 121-124, XP002549378.

Search Report and Written Opinion dated Jun. 8, 2010 for corresponding PCT Application No. PCT/US2010/026909.

Search Report and Written Opinion dated Jun. 8, 2010 for corresponding PCT Application No. PCT/US2010/026897.

Search Report and Written Opinion dated Jun. 8, 2010 for corresponding PCT Application No. PCT/US2010/026905.

Search Report and Written Opinion dated Jun. 8, 2010 for corresponding PCT Application No. PCT/US2010/026894.

Search Report and Written Opinion dated Jun. 8, 2010 for corresponding PCT Application No. PCT/US2010/026907.

Search Report and Written Opinion dated Jun. 8, 2010 for corresponding PCT Application No. PCT/US2010/026900.

International Preliminary Report on Patentability dated Sep. 22, 2011 for corresponding International Application No. PCT/US2010/026909.

International Preliminary Report on Patentability dated Sep. 22, 2011 for corresponding International Application No. PCT/US2010/026897.

International Preliminary Report on Patentability dated Sep. 22, 2011 for corresponding International Application No. PCT/US2010/026905.

International Preliminary Report on Patentability dated Sep. 22, 2011 for corresponding International Application No. PCT/US2010/026894.

International Preliminary Report on Patentability dated Sep. 22, 2011 for corresponding International Application No. PCT/US2010/026907.

International Preliminary Report on Patentability dated Sep. 22, 2011 for corresponding International Application No. PCT/US2010/026900.

Office Action dated Nov. 2, 2012 for corresponding U.S. Appl. No. 12/947,321.

Corel Paint Shop Pro Photo X2 Reviewer's Guide, Copyright 2007, web page at http:/ /web.archive.org/web/20071102133023/http://www.corel.com/conte nt!vpk!psppx2/PS P PX2Reviewer_Guide.pdf, as available via the Internet and accessed Apr. 7, 2012.

Chowdhury, M.A. et al., "The Effect of Amplitude of Vibration on the Coefficient of Friction for Different Materials," Tribology International, 2008, 41:307-314.

Tang, H. et al., "A Microfabricated Electrostatic Haptic Display for Persons with Visual Impairments," IEEE Transactions on Rehabilitation Engineering, Sep. 1998, 6(3):241-314.

Office Action dated Nov. 15, 2012 for corresponding U.S. Appl. No. 12/947,532.

Office Action dated Jan. 15, 2013 for corresponding U.S. Appl. No. 12/696,908.

Office Action dated Jan. 15, 2013 for corresponding U.S. Appl. No. 12/697,037.

(56) References Cited

OTHER PUBLICATIONS

Office Action dated Jan. 15, 2013 for corresponding U.S. Appl. No. 12/696,900.
Japanese Patent Office, Notice of Reasons for Rejection, Application No. JP 2014-171836, dated Nov. 4, 2015.
Japanese Patent Office, Notice of Reasons for Rejection, Application No. JP 2011-554174, dated Jan. 28, 2014.
Korean Patent Office, Notice of Preliminary Rejection, Application No. 10-2011-7023927, dated Sep. 30, 2015.
Korean Patent Office, Notice of Preliminary Rejection, Application No. 10-2011-7023926, dated Sep. 30, 2015.
State Intellectual Property Office of the Peoples Republic of China, Notification of the Second Office Action, Application No. 201080011708 dated Jul. 10, 2014.
State Intellectual Property Office of the Peoples Republic of China, Notification of the Third Office Action, Application No. 201080011708 dated Jan. 26, 2015.
Japanese Patent Office, Office Action, Application No. JP 2015-083829 dated Feb. 16, 2016.
Japanese Patent Office, Notice of Reasons for Rejection, Application No. JP 2011-554180 dated Jan. 7, 2014.
Japanese Patent Office, Decision of Rejection, Application No. JP 2011-554180 dated Dec. 16, 2014.
State Intellectual Property Office of the Peoples Republic of China, Notification of the Second Office Action, Application No. 201080011743 dated Apr. 3, 2014.
State Intellectual Property Office of the Peoples Republic of China, Decision on Rejection, Application No. 201080011743 dated Nov. 3, 2014.
State Intellectual Property Office of the Peoples Republic of China, Notification of the First Office Action, Application No. 201080011744 dated Sep. 23, 2013.
Japanese Patent Office, Notice of Reasons for Rejection, Application No. JP 2011-554172 dated Jan. 28, 2014.
State Intellectual Property Office of the Peoples Republic of China, Notification of the Second Office Action, Application No. 201080011744 dated Jun. 24, 2014.
State Intellectual Property Office of the Peoples Republic of China, Notification of the Third Office Action, Application No. 201080011744 dated Dec. 16, 2014.
State Intellectual Property Office of the Peoples Republic of China, Notification of the Fourth Office Action, Application No. 201080011744 dated Aug. 12, 2015.
Korean Patent Office, Notice of Preliminary Rejection, Application No. 10-2011-7023987 dated Aug. 21, 2015.
Japanese Patent Office, Office Action, Application No. JP 2015-019308 dated Mar. 1, 2016.
United States Patent and Trademark Office, Office Action, U.S. Appl. No. 12/696,893 dated Feb. 29, 2012.
United States Patent and Trademark Office, Office Action, U.S. Appl. No. 12/696,893 dated Sep. 6, 2012.
United States Patent and Trademark Office, Office Action, U.S. Appl. No. 12/696,893 dated Jun. 6, 2013.
United States Patent and Trademark Office, Office Action, U.S. Appl. No. 12/696,893 dated Oct. 22, 2013.
United States Patent and Trademark Office, Office Action, U.S. Appl. No. 12/696,893 dated Mar. 11, 2014.
Meyer, D. et al., Fingertip Friction Modulation due to Electrostatic Attraction, IEEE World Haptics Conference 2013, Apr. 14-18, Korea, pp. 43-48.
Japanese Patent Office, Decision of Rejection, Application No. JP 2011-554175 dated Mar. 1, 2016.
Japanese Patent Office, Notice of Reasons for Rejection, Application No. JP 2015-020413 dated Mar. 1, 2016.
Japanese Patent Office, Notice of Reasons for Rejection, Application No. JP 2015-019308 dated Feb. 26, 2016.
Korean Patent Office, Notice of Preliminary Rejection, Application No. 10-2011-7023927 dated Jun. 24, 2016.
United States Patent and Trademark Office, Office Action, U.S. Appl. No. 12/696,900 dated Aug. 19, 2016.
United States Patent and Trademark Office, Office Action, U.S. Appl. No. 12/697,010 dated May 20, 2016.
United States Patent and Trademark Office, Office Action, U.S. Appl. No. 12/697,037 dated Jun. 6, 2016.
United States Patent and Trademark Office, Office Action, U.S. Appl. No. 12/696,900 dated May 9, 2016.
United States Patent and Trademark Office, Office Action, U.S. Appl. No. 12/696,908 dated May 26, 2016.
Korean Patent Office, Notice of Final Rejection, Application No. 10-2011-7023927 dated May 12, 2016.
United States Patent and Trademark Office, Office Action, U.S. Appl. No. 12/697,037 dated Jan. 17, 2017.
United States Patent and Trademark Office, Office Action, U.S. Appl. No. 12/947,532 dated Feb. 2, 2017.
United States Patent and Trademark Office, Office Action, U.S. Appl. No. 12/697,010 dated Feb. 22, 2017.
United States Patent and Trademark Office, Office Action, U.S. Appl. No. 12/696,900 dated Dec. 12, 2016.
Korean Patent Office, Notice of Second Final Rejection, Application No. 10-2011-7023927 dated Jan. 1, 2017.
Korean Patent Office, Notice of Preliminary Rejection, Application No. 10-2017-7002821 dated Feb. 20, 2017.
United States Patent and Trademark Office, Office Action, U.S. Appl. No. 12/696,908 dated Nov. 10, 2016.
United States Patent and Trademark Office, Office Action, U.S. Appl. No. 12/697,010 dated Sep. 16, 2016.
United States Patent and Trademark Office, Office Action, U.S. Appl. No. 12/947,532 dated Sep. 9, 2016.
"2004 UBC CS Technical Report Abstracts", The ICICS/CS Reading Room, Available Online at: http://www.cs.ubc.ca/cgi-bin/tr/2004/ful, 2004, pp. 1-5.
U.S. Appl. No. 12/696,900 , "Non-Final Office Action", dated Apr. 26, 2012, 11 pages.
U.S. Appl. No. 12/696,908 , "Final Office Action", dated Jun. 29, 2017, 19 pages.
U.S. Appl. No. 12/696,908 , "Non-Final Office Action", dated Mar. 31, 2017, 17 pages.
U.S. Appl. No. 12/696,908 , "Non-Final Office Action", dated Sep. 21, 2017, 20 pages.
U.S. Appl. No. 12/696,908 , "Non-Final Office Action", dated Mar. 27, 2012, 24 pages.
U.S. Appl. No. 12/697,010 , "Final Office Action", dated Jan. 18, 2013, 15 pages.
U.S. Appl. No. 12/697,010 , "Non-Final Office Action", dated Apr. 11, 2012, 22 pages.
U.S. Appl. No. 12/697,037 , "Non-Final Office Action", dated Apr. 12, 2012, 16 pages.
U.S. Appl. No. 15/601,580 , "Non-Final Office Action", dated Feb. 27, 2018, 5 pages.
U.S. Appl. No. 15/649,208 , "Non-Final Office Action", dated Dec. 21, 2017, 5 pages.
U.S. Appl. No. 15/894,966 , "Final Office Action", dated Sep. 7, 2018, 8 pages.
U.S. Appl. No. 15/894,966 , "Non-Final Office Action", dated Mar. 28, 2018, 6 pages.
U.S. Appl. No. 15/988,359 , "Non-Final Office Action", dated Jun. 29, 2018, 14 pages.
U.S. Appl. No. 16/271,031 , "Non-Final Office Action", dated Jul. 18, 2019, 10 pages.
Chakrabarti et al., "Rendering Color Information Using Haptic Feedback", University of British Columbia CS Technical Report, Available online at: https//www.cs.ubc.ca/cgi-bin/tr/2004/TR-2004-10.pdf, Jul. 22, 2004, 9 pages.
CN201080011708.7 , "Office Action", dated Aug. 28, 2013, 33 pages.
CN201080011708.7 , "Office Action", dated Jul. 22, 2015, 4 pages.
CN201510760216.2 , "Office Action", dated Nov. 3, 2017, 10 pages.
CN201510760216.2 , "Office Action", dated Jun. 26, 2018, 6 pages.
CN201610196586.2 , "Office Action", dated Jun. 15, 2018, 26 pages.
CN201610196586.2 , "Office Action", dated Jan. 29, 2019, 34 pages.

(56) References Cited

OTHER PUBLICATIONS

CN201610196586.2, "Office Action", dated May 27, 2019, 6 pages.
EP10712198.0, "Office Action", dated Feb. 27, 2017, 5 pages.
EP10712199.8, "Office Action", dated Feb. 28, 2017, 4 pages.
EP10712200.4, "Office Action", dated Mar. 1, 2017, 5 pages.
EP10712202.0, "Office Action", dated May 19, 2017, 5 pages.
EP18185362.3, "Extended European Search Report", dated Nov. 22, 2018, 15 pages.
EP18207390.8, "Extended European Search Report", dated Mar. 8, 2019, 11 pages.
JP2015-083829, "Office Action", dated Nov. 8, 2016, 2 pages.
JP2015-083829, "Office Action", dated Jun. 21, 2016, 3 pages.
JP2016-130597, "Office Action", dated Mar. 28, 2017, 6 pages.
JP2016-151799, "Office Action", dated Apr. 25, 2017, 4 pages.
JP2017-093154, "Office Action", dated Mar. 6, 2018, 3 pages.
JP2017-194165, "Office Action", dated Mar. 19, 2019, 4 pages.
JP2017-194165, "Office Action", dated Jul. 31, 2018, 8 pages.
KR10-2011-7023926, "Office Action", dated Feb. 3, 2017, 5 pages.
KR10-2011-7023927, "Office Action", dated Oct. 16, 2018, 16 pages.
KR10-2011-7023927, "Office Action", dated Dec. 30, 2016, 6 pages.
KR10-2016-7023565, "Office Action", dated May 18, 2018, 6 pages.
KR10-2016-7024778, "Office Action", dated Apr. 28, 2017, 11 pages.
KR10-2017-7002821, "Office Action", dated Aug. 29, 2017, 7 pages.
KR10-2017-7002821, "Office Action", dated Nov. 14, 2017, 7 pages.
KR10-2018-7004853, "Office Action", dated May 31, 2018, 15 pages.
KR10-2018-7004853, "Office Action", dated Dec. 31, 2018, 5 pages.
KR10-2018-7016981, "Office Action", dated Aug. 6, 2018, 11 pages.
KR10-2018-7022146, "Office Action", dated Sep. 7, 2018, 9 pages.
KR10-2019-7004887, "Office Action", dated Apr. 12, 2019, 7 pages.
KR10-2019-7011523, "Office Action", dated Jul. 5, 2019, 10 pages.
KR10-2019-7014992, "Office Action", dated Jul. 22, 2019, 9 pages.
PCT/US2010/056829, "International Search Report and Written Opinion", dated Oct. 11, 2011, 11 pages.

* cited by examiner

| Blue 1 | Red 5 | Green 3 |
|---|---|---|
| 351 | 352 | 353 |
| Red 4 | Green 3 | Blue 8 |
| 354 | 355 | 356 |

350

SYSTEMS AND METHODS FOR USING MULTIPLE ACTUATORS TO REALIZE TEXTURES

CROSS-REFERENCES TO RELATED APPLICATIONS

This patent application claims priority to U.S. Provisional Patent Application No. 61/159,482, entitled "Locating Features Using a Friction Display," filed Mar. 12, 2009, which is incorporated by reference herein in its entirety.

This patent application claims priority to: U.S. Provisional Patent Application No. 61/262,041, entitled "System and Method for Increasing Haptic Bandwidth in an Electronic Device," filed Nov. 17, 2009, which is incorporated by reference herein in its entirety.

This patent application claims priority to U.S. Provisional Patent Application No. 61/262,038, entitled "Friction Rotary Device for Haptic Feedback," filed Nov. 17, 2009, which is incorporated by reference herein in its entirety.

This patent application is related to U.S. patent application Ser. No. 12/697,010, filed the same day as the present application and entitled "Systems and Methods for a Texture Engine," which is incorporated by reference herein in its entirety.

This patent application is related to U.S. patent application Ser. No. 12/697,037, filed the same day as the present application and entitled "Systems and Methods for Using Textures in Graphical User Interface Widgets," which is incorporated by reference herein in its entirety.

This patent application is related to U.S. patent application Ser. No. 12/696,893, filed the same day as the present application and entitled "Systems and Methods for Providing Features in a Friction Display," which is incorporated by reference herein in its entirety.

This patent application is related to U.S. patent application Ser. No. 12/696,900, filed the same day as the present application and entitled "Systems and Methods for Friction Displays and Additional Haptic Effects," which is incorporated by reference herein in its entirety.

This patent application is related to U.S. patent application Ser. No. 12/696,908, filed the same day as the present application and entitled "Systems and Methods for Interfaces Featuring Surface-Based Haptic Effects," which is incorporated by reference herein in its entirety.

FIELD OF THE INVENTION

The present invention generally relates to haptic feedback and more particularly to systems and methods for using multiple actuators to realize textures.

BACKGROUND

Over the past several years, the use of handheld devices of all types has grown exponentially. These devices are used as portable organizers, telephones, music players, and gaming systems. Many modern handheld devices now incorporate some type of haptic feedback. As haptic technology improves, devices may incorporate haptic feedback comprising a texture. These devices could benefit from multiple actuators; accordingly, systems and methods for using multiple actuators to realize textures are needed.

SUMMARY

Embodiments of the present invention provide systems and methods for using multiple actuators to realize textures. For example, in one embodiment, a system for using multiple actuators to realize textures comprises: a system comprising: a first actuator configured to receive a first haptic signal and output a first haptic effect based at least in part on the first haptic signal; a second actuator configured to receive a second haptic signal and output a second haptic effect based at least in part on the second haptic signal; and a processor configured to: determine the first haptic effect and the second haptic effect, the first and second haptic effects configured when combined to output a texture; and transmit the first haptic signal to the first actuator and transmit the second haptic signal to the second actuator.

These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1:
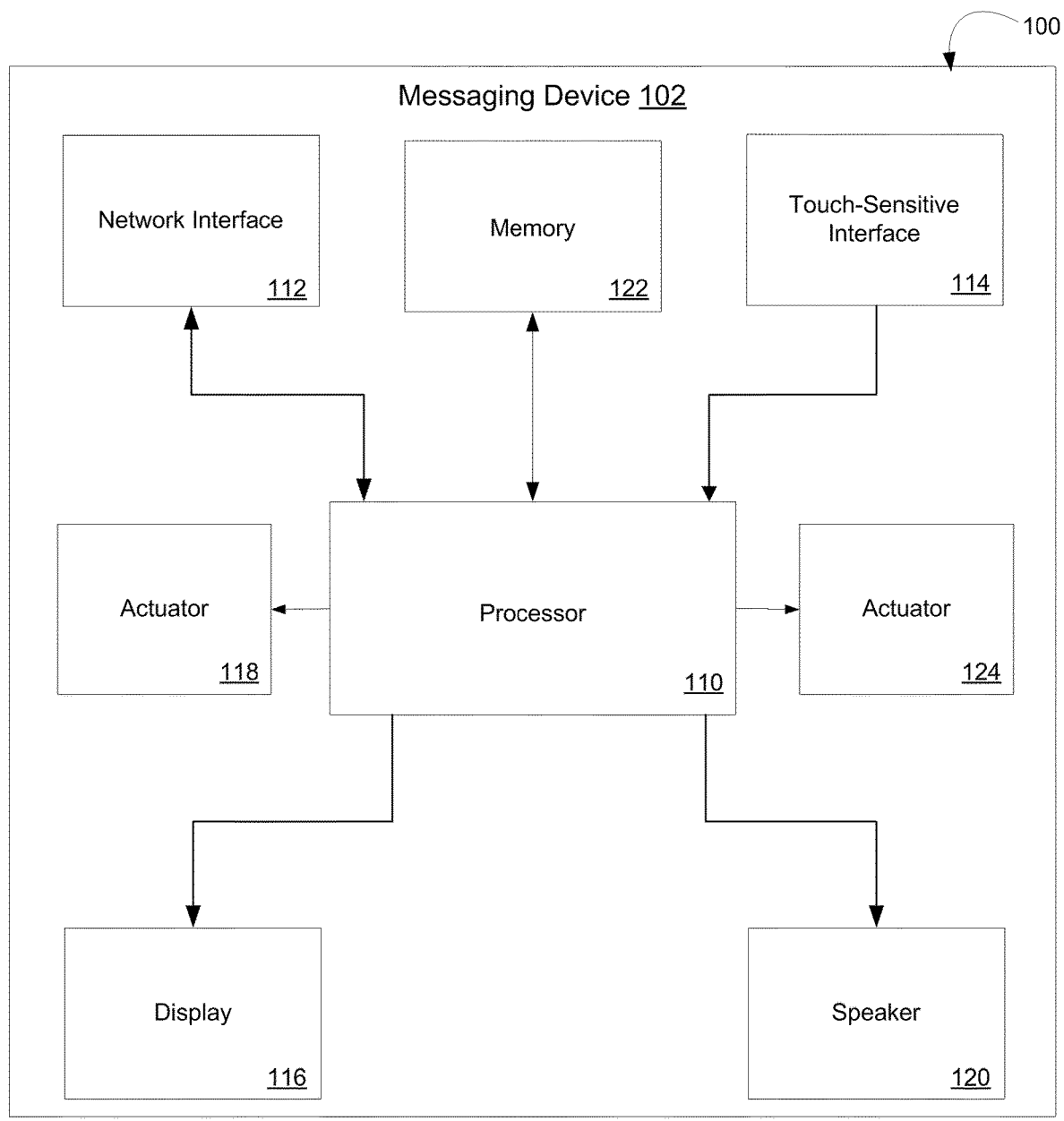
FIG. 1 is a block diagram of a system for using multiple actuators to realize textures according to one embodiment of the present invention.

Embodiments of the present invention provide systems and methods for using multiple actuators to realize textures.

Illustrative Embodiment of Using Multiple Actuators to Realize Textures

One illustrative embodiment of the present invention comprises a messaging device, such as a mobile phone. In the illustrative embodiment, the messaging device comprises the Samsung Haptic Phone (SCH-W420) equipped with Immersion Corporation's TouchSense®3000, TouchSense® 4000, or TouchSense® 5000 vibrotactile feedback systems, formerly known as Immersion Corporation's VibeTonz® vibrotactile feedback system. In other embodiments, different messaging devices and haptic feedback systems may be utilized.

The illustrative messaging device comprises a display, a speaker, a network interface, a memory, and a processor in communication with each of these elements. The illustrative messaging device also comprises a touch-sensitive interface and at least two actuators, which are all in communication with the processor. The touch-sensitive interface is configured to sense a user's interaction with the messaging device, and the actuators are configured to output haptic effects. The illustrative messaging device may further comprise a manipulandum configured to detect a user interaction and transmit an interface signal associated with the user interaction to the processor.

In the illustrative messaging device, the display is configured to display a graphical user interface to the user. The graphical user interface may comprise virtual objects, for example icons, buttons, or a virtual keyboard. The illustrative messaging device further comprises a touch-sensitive interface, such as a touch-screen, mounted overtop of the display. The touch-sensitive interface allows the user to interact with the virtual objects displayed in the graphical user interface. For example, in one embodiment the graphical user interface may comprise a virtual keyboard, and in such an embodiment, the touch-sensitive interface allows the user to touch a key on the virtual keyboard to press that key. This functionality may be used to type messages, or otherwise interact with objects in the graphical user interface.

In the illustrative messaging device the processor is configured to determine a first haptic effect and transmit a first haptic signal corresponding to the first haptic effect to a first actuator configured to output the first haptic effect. The processor is also configured to determine a second haptic effect and transmit a second haptic signal corresponding to the second haptic effect to a second actuator configured to output the second haptic effect. The haptic effect output by each of the actuators may comprise one of several haptic effects known in the art, for example, vibrations, knocking, buzzing, jolting, or torquing the messaging device. In the illustrative messaging device, these haptic effects simulate textures that the user feels on the surface of the touch-sensitive interface. The simulated textures may be associated with the user interface shown on the display. For example, the display may show an icon comprising the shape of a rock. In such an embodiment, the processor may determine a haptic effect configured to simulate the texture of the rock on the surface of the touch-sensitive interface. Then, the processor will transmit a first haptic signal to the first actuator. When the first actuator receives the haptic signal, it will output a haptic effect, such as a vibration, at a frequency configured to cause the surface of the touch-sensitive interface to approximate the texture of the rock.

In some embodiments, the processor may determine a more complex haptic effect that requires multiple actuators to realize. For example, the texture of the rock may comprise cracks and ridges that users will feel when moving their fingers over the user interface. In such an embodiment, the processor may further determine a second haptic effect configured to simulate the cracks and ridges. Then the processor will transmit a second haptic signal associated with the second haptic effect to a second actuator. When the second actuator receives the second haptic signal, it will output the second haptic effect.

In some embodiments, the first and the second haptic effects are configured, when combined, to form a single haptic effect. For example, the first and second haptic effects may comprise two vibrations that when combined form harmonics that simulate a texture on the surface of the touch-sensitive interface. In other embodiments, the two haptic effects may be felt separately. For example, one haptic effect may comprise a vibration configured to simulate the texture of sand on the surface of the touch-sensitive interface. And the second haptic effect may comprise a pulsing vibration configured to simulate the texture of pebbles or other material in the sand.

In the illustrative embodiment, the processor may implement a haptic map to determine the first and second haptic effects. For example, in the illustrative embodiment, the processor may receive a display signal comprising a plurality of pixels, each of the pixels associated with a color. For example, in the illustrative embodiment, each pixel in the display signal may be associated with color red, green, or blue, and may further be associated with an intensity for that color. In the illustrative embodiment, the processor will assign a haptic value to each color and further assign a haptic intensity associated with the intensity of each color. Then, the processor will transmit a first haptic signal comprising some of the haptic values and haptic intensities to the first actuator. The processor may also transmit a second haptic signal comprising additional haptic values and haptic intensities to the second actuator. In the illustrative embodiment, the processor may transmit all the haptic values associated with one color, for example the color red, to the first actuator and transmit all the haptic values associated with the other colors to the second actuator.

In some embodiments, processor 110 may utilize a haptic map to determine the haptic effect and then output the display signal to display 116. In other embodiments, processor 110 may determine the haptic effect using a haptic map, and then not transmit the display signal to display 116. In such an embodiment, the display 116 may stay dark, or off, while actuators 118 and 124 are outputting the haptic effect. For example, in such an embodiment, processor 110 may receive a display signal from a digital camera associated with messaging device 102. In some embodiments, in order to conserve battery power, the user may have deactivated display 116. In such an embodiment, the processor may utilize a haptic map to provide the user with a haptic effect simulating a texture on the surface of the display. This texture may be used to alert the user when the camera is in focus, or when some other event has occurred. For example, processor 110 may use facial recognition software to determine haptic effects simulating textures at locations on display 116 that would be associated with faces if display 116 were activated.

In the illustrative embodiment, the processor may further determine the first haptic effect and the second haptic effect based on an external trigger. For example, in the illustrative embodiment, the processor is configured to receive an interface signal from a touch-sensitive interface configured to detect a user interaction. Then, in the illustrative embodiment, the processor will determine the first haptic effect and the second haptic effect based at least in part on the interface signal. For example, the processor may modify the haptic value or intensity of each haptic effect based at least in part on the interface signal. In the illustrative embodiment, if the touch-sensitive interface detects a high-speed or high-pressure user interaction, the processor will determine higher intensity haptic effects.

The illustrative messaging device may output haptic effects for a multitude of purposes. For example, in one embodiment, the haptic effect may act as a confirmation that the processor has received an interface signal associated with a user interaction. For example, the graphical user interface may comprise a button. When the touch-sensitive interface detects user interaction associated with pressing the button, it will transmit an interface signal to the processor. In response, the processor may determine haptic effects to confirm receiving the interface signal. In such an embodiment, the haptic effects may be configured to simulate a texture on the surface of the touch-sensitive interface. In the illustrative embodiment, the processor may further determine haptic effects for other purposes. For example, the illustrative messaging device may simulate textures on the surface of the touch-sensitive interface to alert the user of boundaries on the display or as an identification of objects such as icons on the surface of the display.

This illustrative example is given to introduce the reader to the general subject matter discussed herein. The invention is not limited to this example. The following sections describe various additional non-limiting embodiments and examples of systems and methods for using multiple actuators to realize textures.

Illustrated System for Using Multiple Actuators to Realize Textures

Referring now to the drawings in which like numerals indicate like elements throughout the several figures, FIG. 1 is a block diagram of a system for using multiple actuators to realize textures according to one embodiment of the present invention. As shown in FIG. 1, the system 100 comprises a messaging device 102, such as a mobile phone, portable digital assistant (PDA), portable media player, portable computer, portable gaming device, or some other mobile device. In some embodiments, messaging device 102 may comprise a full computer such as a laptop, tablet, or desktop PC. In still other embodiments, the messaging device may comprise an external monitor for use with a PC or some other device. The messaging device 102 comprises a processor 110 in communication with a network interface 112, a touch-sensitive interface 114, a display 116, two actuators 118 and 124, a speaker 120, and a memory 122.

The processor 110 is configured to execute computer-executable program instructions stored in memory 122. For example, processor 110 may execute one or more computer programs for messaging or for generating haptic feedback. Processor 110 may comprise a microprocessor, a digital signal processor (DSP), an application-specific integrated circuit (ASIC), one or more field programmable gate arrays (FPGAs), or state machines. Processor 110 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or other similar devices.

Memory 122 comprises a computer-readable medium that stores instructions, which when executed by processor 110, cause processor 110 to perform various steps, such as those described herein. Embodiments of computer-readable media may comprise, but are not limited to, an electronic, optical, magnetic, or other storage or transmission devices capable of providing processor 110 with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. In addition, various other devices may include computer-readable media such as a router, private or public network, or other transmission devices. The processor 110 and the processing described may be in one or more structures, and may be dispersed throughout one or more structures.

Processor 110 is in communication with a network interface 112. Network interface 112 may comprise one or more methods of mobile communication, such as infrared, radio, Wi-Fi, or cellular network communication. In other variations, network interface 112 comprises a wired network interface, such as Ethernet. The messaging device 102 can be configured to exchange messages or virtual message objects with other devices (not shown) over networks such as a cellular network and/or the Internet. Embodiments of messages exchanged between devices may comprise voice messages, text messages, data messages, or other forms of digital messages.

Processor 110 is also in communication with one or more touch-sensitive interfaces 114. In some embodiments, touch-sensitive interface 114 may comprise a touch-screen or a touch-pad. For example, in some embodiments, touch-sensitive interface 114 may comprise a touch-screen mounted overtop of a display configured to receive a display signal and output an image to the user. In other embodiments, touch-sensitive interface 114 may comprise an optical sensor or another type of sensor. In one embodiment, touch-sensitive interface may comprise an LED detector. For example, in one embodiment, touch-sensitive interface 114 may comprise an LED finger detector mounted on the side of display 116. In other embodiments, touch-sensitive interface 114 may comprise a button, switch, scroll wheel, roller ball, or some other type of physical device interface known in the art. In some embodiments, the processor is in communication with a single touch-sensitive interface 114, in other embodiments, the processor is in communication with a plurality of touch-sensitive interfaces, for example, a touch-screen and a roller ball. The touch-sensitive interface 114 is configured to detect user interaction, and based on the user interaction, transmit signals to processor 110. In some embodiments, touch-sensitive interface 114 may be configured to detect multiple aspects of the user interaction. For example, touch-sensitive interface 114 may detect the speed and pressure of a user interaction, and incorporate this information into the interface signal.

In the embodiment shown in FIG. 1, processor 110 is also in communication with a display 116. Processor 110 can be configured to generate a graphical representation of a user interface to be shown on display 116, then transmit a display signal comprising the graphical representation to display 116. In other embodiments, display 116 is configured to receive a display signal from another device. For example, in some embodiments, display 116 may comprise an external display such as a computer monitor. Display 116 is configured to receive a display signal and output an image associated with that display signal. In some embodiments, the display signal may comprise a vga, hdmi, svga, video, s-video, or other type of display signal known in the art. In some embodiments, display 116 comprises a flat-screen display, such as a Liquid Crystal Display (LCD) or Plasma Screen Display. In other embodiments display 116 comprises a Cathode Ray Tube (CRT) or other type of display known in the art. In still other embodiments, display 116 may comprise touch-sensitive interface 114, for example, display 116 may comprise a touch-screen LCD. In still other embodiments, display 116 may comprise a flexible screen or flexible display. For example, in some embodiments, display 116 may comprise a haptic substrate mounted underneath its surface. In such an embodiment, display 116 is made of a flexible material, and in response to signals received from processor 110, the haptic substrate flexes, forming ridges, troughs, or other features on the surface of display 116. In some embodiments, the haptic substrate may comprise a plasma actuator, a piezoelectric actuator, an electro-active polymer, a micro-electro-mechanical system, a shape memory alloy, a grid of fluid or gas-filled cells.

In some embodiments, processor 110 receives signals from touch-sensitive interface 114 that are associated with an interaction with the graphical user interface shown on display 116. For example, in one embodiment, touch-sensitive interface 114 may comprise a touch-screen, and a graphical user interface on display 116 may comprises a virtual keyboard. In such an embodiment, when the user interacts with a section of the touch-screen that overlays one of the keys of the virtual keyboard, the touch-screen will send an interface signal to processor 110 corresponding to that user interaction. Based on the interface signal, processor 110 will determine that the user pressed one of the keys on the virtual keyboard. This functionality allows the user to interact with other icons and virtual objects on the display 116. For example, in some embodiments the user may flick the touch-screen to move a virtual ball or turn a virtual knob. In another embodiment, the messaging device 102 may comprise another touch-sensitive interface 114, such as a scroll wheel, roller ball, or button. In such an embodiment, the additional touch-sensitive interface 114 may facilitate similar interactions between the user and the graphical user interface.

As shown in FIG. 1, processor 110 is also in communication with an actuation system comprising at least two actuators 118 and 124, a suspension system for each actuator, and electrical power and control wiring for each actuator. In some embodiments, messaging device 102 comprises more than one actuation system. Processor 110 is configured to determine a first haptic effect and transmit a first haptic signal corresponding to the first haptic effect to actuator 118. Processor 110 is also configured to determine a second haptic effect and transmit a second haptic signal corresponding to the second haptic effect to actuator 124. In some embodiments, the haptic effect simulates a vibrotactile texture felt on the surface of display 116, touch-sensitive interface 114, or the housing of messaging device 102. In some embodiments, determining each haptic effect may comprise performing a series of calculations. In other embodiments, determining each haptic effect may comprise accessing a lookup table. In still other embodiments, determining each haptic effect may comprise a combination of lookup tables and calculations.

In some embodiments, determining the haptic effects may comprise a haptic map. In such an embodiment, determining the haptic effect may comprise mapping the display signal to actuators 118 and 124. For example, the display signal may comprise a plurality of pixels, each of the pixels associated with a color. In such an embodiment, each pixel may be associated with the color red, green, or blue; that color may further be associated with an intensity, for example, an intensity of 1-8. In such an embodiment, determining the haptic effect may comprise assigning a haptic effect to each color. In some embodiments, the haptic effect may comprise a direction and intensity of operation, for example, in one embodiment the haptic signal may be configured to cause a rotary actuator to rotate clockwise at one-half power. In some embodiments, the intensity of operation may be associated with the intensity of the color. Once processor 110 determines a haptic effect, it transmits a haptic signal comprising the haptic effect to the actuators. In some embodiments, processor 110 may assign a haptic effect to only some of the pixels in the display signal. For example, in such an embodiment, the haptic effect may be associated with only a portion of the display signal. In other embodiments, processor 110 is configured to map part of the display signal to one actuator and the rest of the display signal to the other actuator. For example, in such an embodiment, processor 110 may be configured to map haptic effects associated with the color red to actuator 118, and all other haptic effects to actuator 124.

In some embodiments, processor 110 may determine the first haptic effect and the second haptic effect based at least in part on a user interaction or trigger. In such an embodiment, processor 110 receives an interface signal from touch-sensitive interface 114, and determines the first haptic effect and the second haptic effect based at least in part on the interface signal. For example, in some embodiments, processor 110 may determine the first haptic effect and the second haptic effect based on the location of the user interaction detected by touch-sensitive interface 114. For example, in such an embodiment, processor 110 may determine haptic effects to simulate the texture of a virtual object on display 116. In other embodiments, processor 110 may determine the intensity of each haptic effect based at least in part on the interface signal. For example, if touch-sensitive interface 114 detects a high-pressure user interaction, processor 110 may determine high-intensity haptic effects. In another embodiment, if touch-sensitive interface 114 detects a low-pressure user interaction, processor 110 may determine low-intensity haptic effect. In still other embodiments, processor 110 may determine a first haptic effect, to be output by the first actuator, that is a constant vibration simulating a first texture. In such an embodiment, the processor may determine second haptic effect, to be output by the second actuator, that comprises short pulsing vibrations to simulate textures within the first texture. For example, in one embodiment, the first haptic effect may be configured to simulate the texture of sand and the second haptic effect may be configured to simulate the texture of rocks in the sand.

Once processor 110 determines the first and second haptic effects, it transmits a first haptic signal associated with the first haptic effect to actuator 118 and a second haptic signal associated with the second haptic effect to actuator 124. Actuators 118 and 124 are configured to receive the first and second haptic signals from processor 110 and output corresponding haptic effects. Actuators 118 and 124 may be, for example, piezoelectric actuators, electric motors, electro-magnetic actuators, voice coils, shape memory alloys, electro-active polymers, solenoids, eccentric rotating mass motors (ERM), fixed piezoelectric actuators (FPA). a linear piezoelectric actuator (LPA), or linear resonant actuators (LRA). In some embodiments, actuators 118 and 124 may comprise different types of actuators, for example actuator 118 may comprise an eccentric rotating mass motor and actuator 124 may comprise a linear resonant actuator.

The haptic effects output by actuators 118 and 124 may comprise any of several haptic effects known in the art, for example, vibrations, knocking, buzzing, jolting, or torquing the messaging device. In some embodiments, the haptic effects are configured to simulate a texture that the user feels on the surface of touch-sensitive interface 114 or display 116. This texture may be associated with the graphical user interface shown on display 116. For example, display 116 may display a leather bag. In such an embodiment, processor 110 may transmit haptic signals to actuators 118 and 124 configured to cause actuators 118 and 124 to output haptic effects simulating the texture of the leather. In other embodiments, actuators 118 and 124 may be configured to output haptic effects that simulate the texture of: water, ice, sand, gravel, snow, skin, fur, or another surface. In some embodiments, the haptic effect may be output onto a different portion of messaging device 102, for example onto its housing.

In some embodiments, actuators 118 and 124 are configured to output separate vibrations, that when combined form a single haptic effect. For example, actuator 118 and actuator 124 may each output haptic effects at different frequencies. In some embodiments, when these two haptic effects are combined they form harmonics that the user feels as a haptic effect. For example, in some embodiments, these harmonics may simulate a texture that the user feels on the surface of touch-sensitive interface 114. In other embodiments, one of actuators 118 and 124 is configured to output a constant haptic effect simulating a texture. In such an embodiment, the other actuator may be configured to output a second haptic effect that simulates disturbances in that texture. For example in such an embodiment, actuator 118 may be configured to output a haptic effect simulating the texture of water. In such an embodiment, actuator 124 may be configured to periodically output a haptic effect representing the texture of objects in the water, for example, fish, seaweed, or driftwood. In still other embodiments, actuator 118 and actuator 124 may be configured to output the same haptic effect, but may be configured to increase the frequency response of the haptic effect as the user moves over the surface of the touch-sensitive interface 114. For example, in one embodiment, display 116 may comprise a virtual keyboard. In such an embodiment, the user may interact with touch-sensitive interface 114 to type on the keyboard. As the user touches each key, processor 110 may determine a haptic effect to confirm receipt of the user's input. In such an embodiment, the processor may utilize both actuators 118 and 124 in order to reduce the lag time between the haptic effects. For example, the processor may alternate between actuators 118 and 124 as the user types on the keyboard. This allows each actuator to output a haptic effect and reset before it receives another haptic signal and outputs another haptic effect.

Processor 110 may determine haptic effects for a multitude of reasons. In some embodiments, the haptic effects may act as confirmation that processor 110 has received a signal associated with user interaction from touch-sensitive interface 114. For example, in one embodiment, the graphical user interface may comprise a button and touch-sensitive interface 114 may detect user interaction associated with pressing the button. When touch-sensitive interface 114 transmits an interface signal associated with the user interaction to processor 110, processor 110 may determine a haptic effect to confirm receipt of the interface signal. In such an embodiment, the haptic effect may cause the user to feel a texture on the surface of touch-sensitive interface 114. For example, the texture of sand may be used to confirm that processor 110 has received the user input. In other embodiments, a different texture may be used, for example, the texture of water, ice, oil, rocks, or skin. In some embodiments, the haptic effect may serve a different purpose, for example, alerting the user of boundaries on display 116, or providing the user with haptic information about the image on display 116. For example, each icon on display 116 may comprise a different texture. For example, in one embodiment, display 116 may comprise a multiple icons. In such an embodiment, processor 110 may determine a different haptic effect when the user touches each icon. For example, when the user touches one icon processor 110 may determine a haptic effect comprising the texture of skin, and when the user touches another icon processor 110 may determine a haptic effect comprising the texture of water. In further embodiments, the processor may change the texture when the user's finger moves from contact with an icon to contact with the background of the display, thus alerting the user that he/she is no longer touching the icon.

As shown in FIG. 1, processor 110 is also in communication with speaker 120. Speaker 120 is configured to receive audio signals from processor 110 and output them to the user. In some embodiments, the audio signals may be associated with the haptic effect output by actuator 118, or the image output by display 116. In other embodiments, the audio signal may not correspond to the haptic effect or the image.

In some embodiments, processor 110 may further comprise one or more sensors, for example, a GPS sensor, an imaging sensor, accelerometer, location sensor, rotary velocity sensor, light sensor, camera, microphone, or some other type of sensor. The sensor may be configured to detect changes in acceleration, inclination, inertia, or location. For example, messaging device 102 may comprise an accelerometer configured to measure the messaging device's acceleration. The sensor is configured to transmit sensor signals to processor 110.

The sensor signals may comprise one or more parameters associated with a position, a movement, an acceleration, or a "jerk" (i.e. the derivative of acceleration) of the messaging device 102. For example, in one embodiment, the sensor may generate and transmit a sensor signal comprising a plurality of parameters, each parameter associated with a movement along or about one measured translational or rotational axis. In some embodiments, the sensor outputs voltages or currents that processor 110 is programmed to interpret to indicate movement along one or more axes.

In some embodiments, processor 110 will receive the sensor signal and determine that it should activate the virtual workspace and interpret sensed movement of the messaging device 102 in an X, Y, or Z direction as corresponding to a virtual movement "within" the virtual workspace. The user may then move device 102 within the virtual workspace to select functions or files, by gesturing within the virtual space. For example, by moving the messaging device 102 in the Z-Axis overtop of a function within the virtual workspace. In some embodiments, the user may use gestures within the virtual workspace to modify the haptic effects output by messaging device 102.

Figure 2:
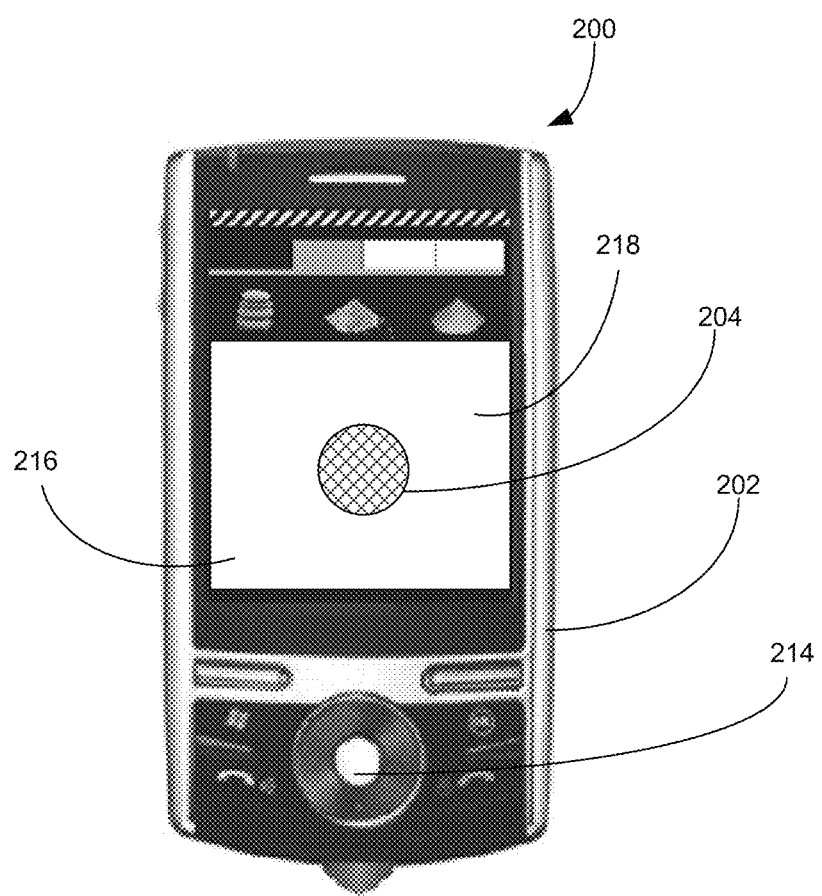
FIG. 2 is an illustration of a system for using multiple actuators to realize textures according to one embodiment of the present invention.

FIG. 2 is an illustration of a system for a using multiple actuators to realize textures according to one embodiment of the present invention. FIG. 2 comprises a messaging device 200, such as a mobile phone, PDA, portable media player, portable gaming device, or mobile computer. The messaging device 200 is configured to send and receive signals, such as voicemail, text messages, and other data messages, over a network such as a cellular network or the Internet. The messaging device 200 may comprise a wireless network interface and/or a wired network interface (not shown in FIG. 2). Although the device 200 is illustrated as a handheld messaging device in FIG. 2, other embodiments may comprise different devices, such as video game systems and/or personal computers.

As shown in FIG. 2, the messaging device 200 comprises a housing 202 and a display 216. In some embodiments, display 216 may comprise an LCD display. In other embodiments, display 216 may comprise a plasma display, or other type of display known in the art. Display 216 is configured to receive a display signal and output an image associated with that display signal. In some embodiments, the display signal may comprise a vga, hdmi, svga, video, s-video, or other type of display signal known in the art. In the embodiment shown in FIG. 2, display 216 comprises a textured ball 204.

Referring still to FIG. 2, the messaging device 200 further comprises a manipulandum 214. In the embodiment shown in FIG. 2, the manipulandum 214 comprises a roller ball and buttons. The messaging device 200 also comprises a touch-sensitive interface 218. In the embodiment shown in FIG. 2, the touch-sensitive interface comprises a touch-screen positioned overtop of display 216. In some embodiments, display 216 and the touch-screen may comprise a single integrated component, such as a touch-screen display.

Manipulandum 214 and touch-sensitive interface 218 are configured to detect user interaction and transmit interface signals corresponding to the user interaction to the processor. In some embodiments, the user interaction is associated with a graphical user interface shown on display 216. In such an embodiment, processor 110 receives the interface signal and, based at least in part on the interface signal, manipulates the image shown on the graphical user interface. For example, in the embodiment shown in FIG. 2, the user may use either manipulandum 214 or touch-sensitive interface 218 to interact with textured ball 204. When the user interacts with textured ball 204, the processor will determine a haptic effect configured to simulate a texture on the surface of textured ball 204. This texture may comprise one of many textures known in the art, for example, the texture of sand, rocks, glass, water, or leather.

Messaging device 200 further comprises at least two actuators configured to receive haptic signals and output a haptic effect (not shown in FIG. 2). In some embodiments, the haptic effect output by each actuator is configured to simulate a vibrotactile texture felt by the user of messaging device 200. Processor 110 is configured to determine a first haptic effect and transmit a first haptic signal corresponding to the first haptic effect to the first actuator. Processor 110 is further configured to determine a second haptic effect and transmit a second haptic corresponding to the second haptic effect to the second actuator. When the first and second actuators receive their respective haptic signals, they are configured to output the determined haptic effect. The user may feel the haptic effects of each actuator via the surface of display 216, or through some other part of messaging device 200, for example via manipulandum 214 or housing 202.

In the embodiment shown in FIG. 2, display 216 comprises a textured ball 204, which may comprise a basketball. The basketball comprises a uniform bumpy texture with shallow ridges forming seams throughout the basketball's exterior. When the user interacts with textured ball 204, processor 110 may determine a first haptic effect comprising a gentle vibration to simulate the uniform bumpy texture of the basketball. Processor 110 may then output the first haptic signal to the first actuator. Processor 110 may further determine a second haptic effect comprising sharp pulses to simulate the ridges on the basketball. In such an embodiment, processor 110 may output a second haptic signal comprising the second haptic effect when the user interacts with a section of the basketball associated with a seam. In other embodiments, the processor may determine different haptic effects to simulate different textures on the surface of display 216.

Illustrations of Systems for Using Multiple Actuators to Realize Textures

Figures 3A, 3B:
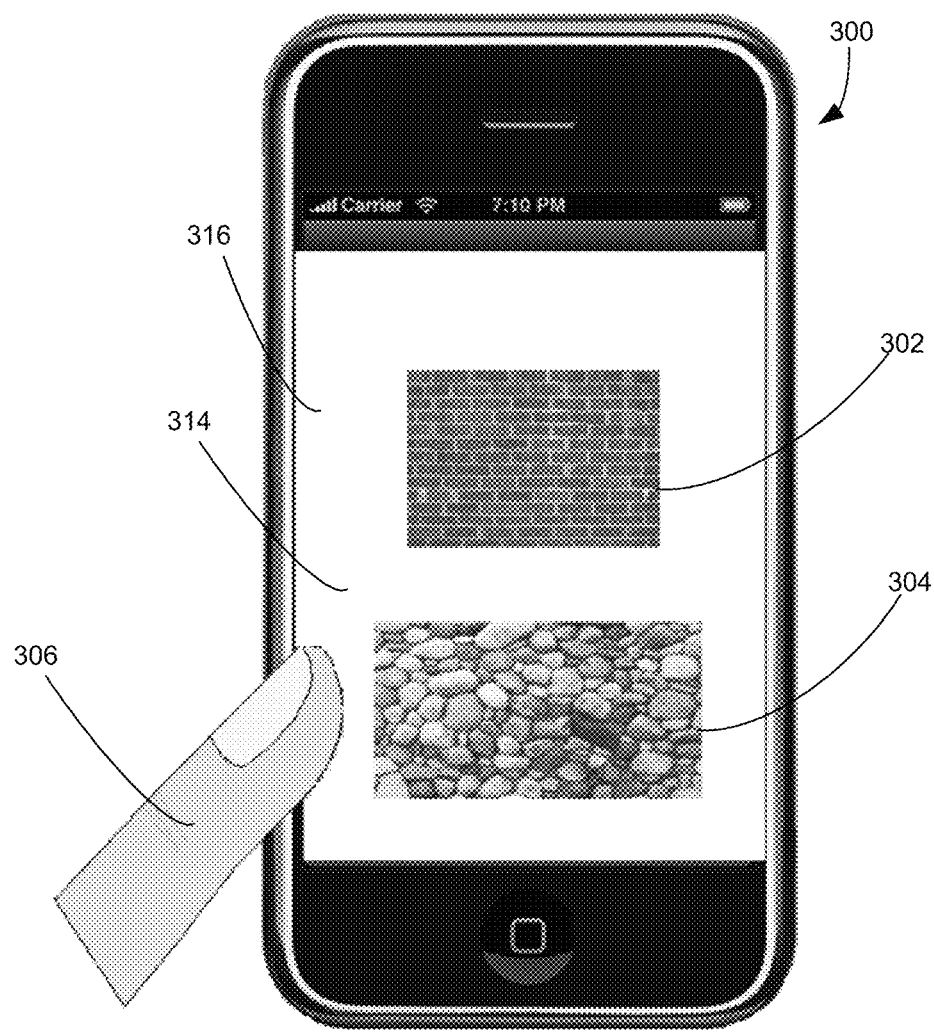
FIG. 3a is another illustration of a system for using multiple actuators to realize textures according to one embodiment of the present invention.
FIG. 3b is another illustration of a system for using multiple actuators to realize textures according to one embodiment of the present invention.

FIG. 3a is an illustration of a system for using multiple actuators to realize textures according to one embodiment of the present invention. FIG. 3a comprises a messaging device 300, such as a mobile phone, PDA, portable media player, portable gaming device, or mobile computer. The messaging device 300 is configured to send and receive signals comprising messages, such as voicemail, text messages, and other data messages, over a network such as a cellular network or the Internet. The messaging device 300 may comprise a wireless network interface and/or a wired network interface (not shown in FIG. 3a). Although the device 300 is illustrated as a handheld messaging device in FIG. 3a, other embodiments may comprise different devices, such as video game systems and/or personal computers.

As shown in FIG. 3a, messaging device 300 comprises a display 316. Display 316 is configured to receive a display signal, and output an image based at least in part on the display signal. Messaging device 300 further compromises a processor (not shown in FIG. 3a) configured to transmit the display signal to display 316. Messaging device 300 further comprises a touch-sensitive interface 314 mounted overtop of display 316. Touch-sensitive interface 314 is configured to detect a user interaction and transmit an interface signal corresponding to the user interaction to the processor. Display 316 comprises two icons 302 and 304. When the user interacts with one of icons 302 and 304, touch-sensitive interface 314 will detect the user interaction and transmit a corresponding interface signal to the processor. Based on this interface signal, the processor may determine that the user has opened a file linked to one of the icons or performed some other action known in the art.

As shown in FIG. 3a, each of icons 302 and 304 comprises a texture. In the embodiment shown, icon 302 comprises the texture of bricks and icon 304 comprises the texture of rocks. In other embodiments, different textures may be used, for example, the texture of sand, water, oil, grass, fur, skin, leather, ice, wood, or some other texture known in the art. When the user, shown in FIG. 3a as finger 306, interacts with the section of display 316 associated with each icon, the processor will determine haptic effects configured to simulate the texture of that icon. The processor will then output signals associated with the haptic effects to at least two actuators (not shown in FIG. 3a) configured to output the haptic effect.

For example, in the embodiment shown in FIG. 3a, when the user interacts with the section of the display associated with icon 302, the processor may determine a first haptic effect configured to simulate the rough texture of bricks. In such an embodiment, the processor may further determine a second haptic effect configured to simulate the rough mortar between the bricks. Then, as the user interacts with icon 302, the processor will output the first haptic signal to a first actuator, simulating the texture of bricks on the surface of display 316. Further, as the user moves his/her finger over icon 302, the processor may periodically transmit the second haptic signal to the second actuator to simulate the texture of the mortar.

In other embodiments, the processor may determine haptic effects that are unrelated to each other. For example, as shown in FIG. 3a, display 316 also comprises a second icon 304, which comprises the texture of rocks. In such an embodiment, the processor may determine a first haptic effect configured to simulate the texture of icon 302 and a second haptic effect configured to simulate the texture of icon 304. Then, as the user interacts with icon 302, the processor may output the first haptic signal to the first actuator. And as the user interacts with icon 304, the processor may output the second haptic signal to the second actuator. Such an embodiment may allow the actuators to output more compelling haptic effects, because each actuator has time to slow and reset while the other actuator is in operation.

FIG. 3b is an illustration of a system for using multiple actuators to realize textures according to one embodiment of the present invention. In the embodiment shown in FIG. 3b, determining the haptic effect comprises mapping the display signal to at least two actuators. The embodiment shown in FIG. 3b, comprises a magnified section of a display 350. Display 350 is configured to receive a display signal from the processor. The display signal comprises a plurality of pixels that are each associated with a color and an intensity of that color. Display 350 receives this display signal and outputs an image associated with the display signal. In the embodiment shown in FIG. 3b, the magnified portion of display 350 comprises six pixels: 351, 352, 353, 354, 355, and 356. Each pixel is associated with a color and an intensity for that color ranging from 1-10. For example, pixel 355 is associated with the color green, and the color intensity 3 out of 10. Thus, the display 350 will output the color green at an intensity of 3 at the location of pixel 355.

In the embodiment shown in FIG. 3b, the processor will determine the haptic effect based at least in part on the display signal and an interface signal received from a touch-sensitive interface mounted overtop of display 350 (not shown in FIG. 3b). For example, in the embodiment shown in FIG. 3b, the processor uses the display signal to associate, or "map," a haptic effect with each pixel. In the embodiment shown in FIG. 3b, the processor may determine a different frequency haptic effect for each color. The processor may further associate the intensity of the haptic effect at each pixel with the intensity of the color at each pixel. For example, the processor may determine that a pixel with a color intensity of 8 will also have a haptic intensity of 8. When the processor receives an interface signal associated with user interaction overtop of the pixels on the display, the processor will output a haptic signal associated with the pixels with which the user is interacting. This haptic effect is configured to cause the user to feel a texture on the surface of the display.

For example, in the embodiment shown in FIG. 3b, the processor may determine blue pixels are associated with a knocking haptic effect, red pixels are associated with a pulsing vibration, and green pixels are associated with a clicking haptic effect. In such an embodiment, when the touch-sensitive interface detects that the user's finger has passed over pixel 351, the processor will determine a knocking with an intensity of 1. Then as the user's finger moves over pixel 352, the processor will determine a pulsing vibration with an intensity of 5. And as the user's finger continues to move across display 350 to pixel 353, the processor may determine a clicking effect with an intensity of 3.

These haptic effects are configured to cause the user to feel a texture on the surface of display 350 as the user moves his/her finger over the surface of display 350. In some embodiments, the processor may be configured to determine which actuator to output the haptic signal to. For example, in one embodiment a messaging device may comprise two actuators configured to output different intensity haptic effects. In such an embodiment, the processor may determine that all haptic effects with an intensity of less than 3 should be output by the first actuator, and all haptic effects with an intensity of greater than or equal to 3 should be output by a second actuator. In other embodiments, each color may be mapped to a specific actuator. For example, in such an embodiment all haptic effects associated with the color blue may be output by a first actuator, all haptic effects associated with the color red may be output by a second actuator, and all haptic effects associated with the color green may be output by a third actuator. In other embodiments, the messaging device may implement different combinations of colors, intensities, haptic effects, and actuators to simulate various textures on the surface of the display.

Figure 4:
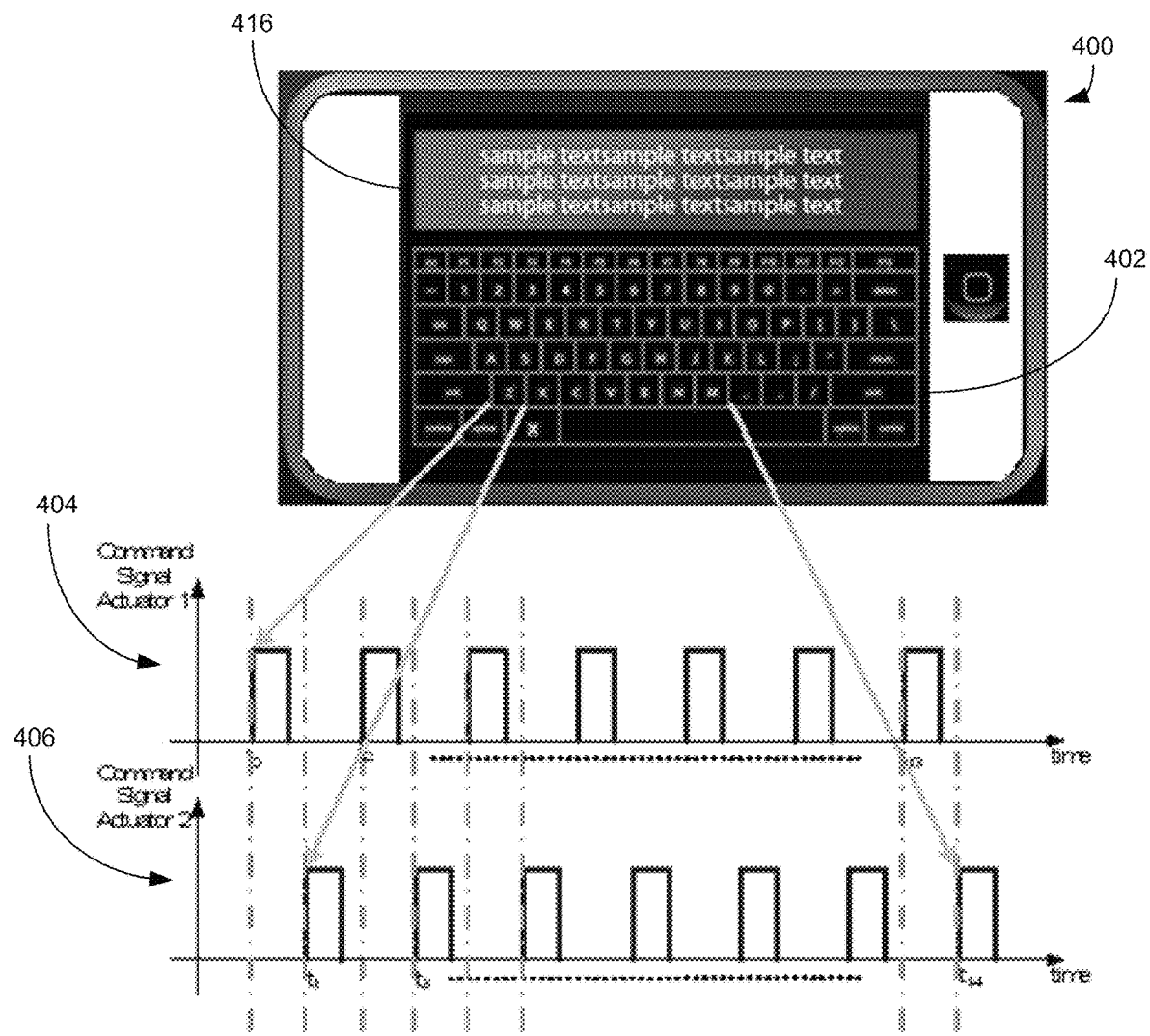
FIG. 4 is another illustration of a system for using multiple actuators to realize textures according to one embodiment of the present invention.

FIG. 4 is another illustration of a system for using multiple actuators to realize textures according to one embodiment of the present invention. FIG. 4 comprises a messaging device 400, which comprises a display 416. Display 416 is positioned underneath a touch-sensitive interface, which is configured to detect user interaction, and transmit interface signal associated with the user interaction to a processor (not shown in FIG. 4). As shown in FIG. 4, display 416 comprises a virtual QWERTY keyboard 402. A user may use virtual QWERTY keyboard 402 to enter textual information into messaging device 400.

As the user interacts with the keys of virtual QWERTY keyboard 402, messaging device 400 is configured to output a haptic effect to alert the user that the processor has received an interface signal from the touch-sensitive interface. For example, when the processor receives an interface signal from the touch-sensitive interface indicating that the user has pressed a key on virtual QWERTY keyboard, the processor may determine a first haptic effect and then transmit a signal corresponding to the first haptic effect to a first actuator. The first actuator then outputs the first haptic effect. When the processor receives an interface signal indicating that the user has pressed another key on the virtual QWERTY keyboard, the processor determines a second haptic effect and transmits a second signal corresponding to the second haptic effect to a second actuator. The second actuator then outputs the second haptic effect.

In some embodiments, the first and second haptic effects may be configured to comprise the same haptic effect. For example, in some embodiments, both the first and the second haptic effects may be configured to simulate the texture of sand on the surface of the touch-sensitive interface. In other embodiments, the first and the second haptic effect may differ. For example, the first haptic effect may be configured to simulate the texture of sand, and the second haptic effect may be configured to simulate the texture of grass. In such an embodiment, a section of the touch-sensitive interface may be associated with the first haptic effect, and the rest of the touch-sensitive interface may be associated with the second haptic effect.

The functionality discussed in the preceding paragraphs could be implemented using a single actuator; however, FIG. 4 illustrates the advantages of using two or more actuators.

The embodiment shown in FIG. 4 comprises a messaging device 400, which comprises a hand-held device. Users may interact with virtual QWERTY keyboard 402 with their thumbs and fingers. In the embodiment shown in FIG. 4, the keys of virtual QWERTY keyboard 402 are approximately 6 mm square. In other embodiments, the keys of virtual QWERTY keyboard 402 may be larger or smaller than 6 mm square. In the embodiment shown in FIG. 4, a hypothetical user might explore the virtual keyboard at a rate of seven keys per second. Such a hypothetical user's finger would be moving at approximately 42 mm per second (7 keys*6 mm per key). In some embodiments, the haptic effect could be configured to simulate two distinct edges on each key. For example, a haptic effect may be used to simulate the texture of a left edge and a right edge for each key. Thus, in order to apply texture comprising distinct edges to each key, a single actuator would have to produce up to fourteen edges in one second (7 keys per second*2 edges per key), which corresponds to approximately 71 milliseconds per edge (1 second/14 edges).

In some embodiments, a single high-frequency actuator could output a haptic effect with a response rate capable of simulating fourteen key edges per second. Another embodiment may implement two or more actuators to reduce the response time required for each actuator. An embodiment comprising two or more actuators provides more time for each actuator to power down and reset between each haptic effect, and thus reduces the risk that haptic effects output by one actuator will blend together. This is demonstrated by chart 404, which shows a timing chart for a first actuator in a two actuator system, and chart 406, which shows a timing chart for a second actuator in a two actuator system. As is shown in charts 404 and 406, in a two actuator system, the processor can output two distinct haptic signals, which do not overlap with each other. Thus, the first actuator can power down and reset while the second actuator is outputting a haptic effect. And the second actuator can power down and reset while the first actuator is outputting a haptic effect. This reduces the risk that the haptic effect output by one of the actuators will blend into the haptic effect it has just output. In some embodiments, this functionality may be used to output the same haptic effect at a faster response rate. In other embodiments, this functionality may be used to output different haptic effects immediately after each other.

In an embodiment comprising two or more actuators, each actuator may output different haptic effects at the same time, thus increasing the richness of available haptic effects. For example, each actuator may output a different frequency or type of haptic effect, which is configured to simulate a different texture. In some embodiments, the user may feel these textures at the same time, but at different locations, on the messaging device 400. For example, in one embodiment, a first actuator may output a first haptic effect configured to simulate a texture on a first icon, while at the same time, a second actuator may output a second haptic effect configured to simulate a second texture on a second icon. In such an embodiment, the user may feel the first texture on the first icon and, at the same time, feel the second texture on the second icon. In other embodiments, both actuators may be configured to output separate haptic effects that, when combined, are configured to simulate a single texture.

Illustrations of Methods for Using Multiple Actuators to Realize Textures

Figure 5:
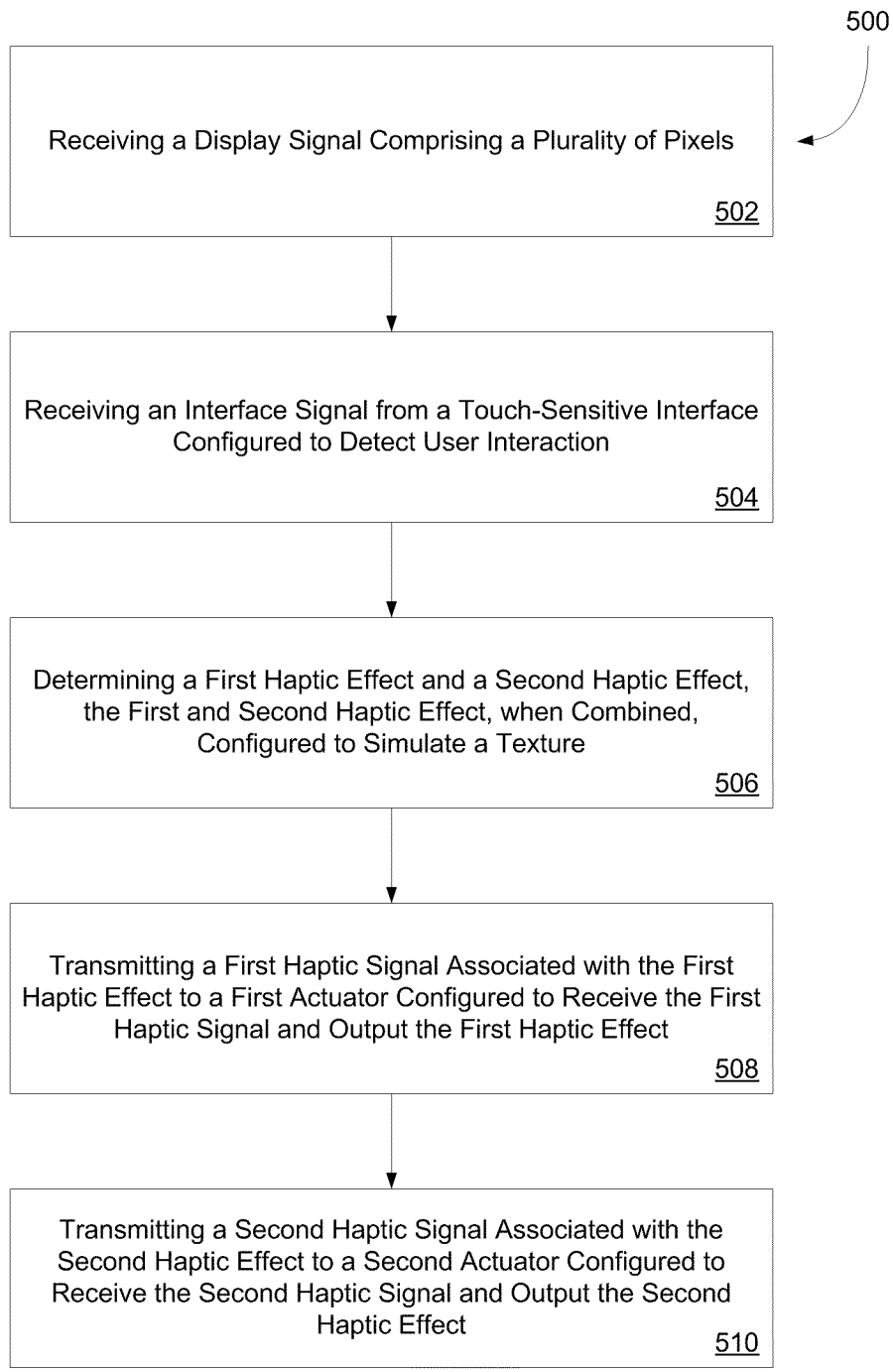
FIG. 5 is a flow chart of a method for using multiple actuators to realize textures according to one embodiment of the present invention.

FIG. 5 is a flow chart of a method for using multiple actuators to realize textures according to one embodiment of the present invention, which is discussed with respect to the device shown in FIG. 1. As shown in FIG. 5, the method 500 begins when processor 110 receives a display signal comprising a plurality of pixels 502. The display signal may comprise a vga, hdmi, svga, video, s-video, or other type of display signal known in the art. The display signal may comprise a graphical user interface, or other image that the messaging device will display to the user via display 116.

Then, touch-sensitive interface 114 transmits an interface signal to processor 110, which receives the interface signal 504. In some embodiments, touch-sensitive interface 114 may comprise a touch-screen or a touch-pad. For example, in some embodiments, touch-sensitive interface 114 may comprise a touch-screen mounted overtop of display 116, which is configured to receive a display signal and output an image to the user. In other embodiments, touch-sensitive interface 114 may comprise a button, switch, scroll wheel, roller ball, or some other type of physical device interface known in the art. In some embodiments, processor 110 is in communication with a single touch-sensitive interface 114. In other embodiments, processor 110 is in communication with a plurality of touch-sensitive interfaces 114, for example, a touch-screen and a roller ball. Touch-sensitive interface 114 is configured to detect user interaction, and based on the user interaction, transmit signals to processor 110. In some embodiments, touch-sensitive interface 114 may be configured to detect multiple aspects of the user interaction. For example, touch-sensitive interface 114 may detect the speed and pressure of a user interaction and incorporate this information into the interface signal.

Next, processor 110 determines a first haptic effect and a second haptic effect, the first and second haptic effect, when combined, configured to simulate a texture 506. Both the first haptic effect and the second haptic effect may comprise a vibration that the user feels through the surface of a touch-sensitive interface 114 or a manipulandum. In some embodiments, these vibrations may cause the user to feel a texture on the surface of touch-sensitive interface 114. For example, the texture of leather, snow, sand, ice, skin, or some other surface. In some embodiments, processor 110 may use an algorithm to determine the haptic effect. In other embodiments, processor 110 may access a lookup table to determine the appropriate haptic effect. In still other embodiments, processor 110 may access a lookup table and implement an algorithm to determine the haptic effect.

In some embodiments, processor 110 may implement a haptic map to determine each haptic effect. In such an embodiment, processor 110 may map the display signal to two or more actuators. For example, the display signal may comprise a plurality of pixels, each of the pixels associated with a color. In such an embodiment, processor 110 may determine the haptic effect by assigning a haptic value to each color in the display signal. Then processor 110 will output haptic signals comprising the haptic values. In some embodiments, processor 110 may assign a haptic value to only some of the pixels in the display signal. For example, in such an embodiment, the haptic effect may be associated with only a portion of the display signal.

In some embodiments, processor 110 may determine the haptic effect, based at least in part on a user interaction or trigger. In such an embodiment, processor 110 receives an interface signal from touch-sensitive interface 114, and determines the haptic effect based, at least in part, on the interface signal. For example, in some embodiments, processor 110 may determine different intensity haptic effects based on the interface signal received from touch-sensitive interface 114. For example, if touch-sensitive interface 114 detects a high pressure user interaction, processor 110 may determine a high-intensity haptic effect. In another embodiment, if touch-sensitive interface 114 detects a low pressure user interaction, processor 110 may determine a low-intensity haptic effect.

Then, processor 110 transmits a first haptic signal associated with the first haptic effect to a first actuator 118, which is configured to receive the haptic signal and output the first haptic effect 508. Actuator 118 is configured to receive a haptic signal from processor 110 and output the haptic effect. Actuator 118 may be, for example, a piezoelectric actuator, an electric motor, an electro-magnetic actuator, a voice coil, a linear resonant actuator, a shape memory alloy, an electro-active polymer, a solenoid, an eccentric rotating mass motor (ERM), or a linear resonant actuator (LRA). The haptic effect may comprise one of several haptic effects known in the art, for example, vibrations, knocking, buzzing, jolting, or torquing the messaging device.

Finally, processor 110 transmits a second haptic signal associated with the second haptic effect to a second actuator 124, which is configured to receive the haptic signal and output the second haptic effect 510. Actuator 124 is configured to receive a haptic signal from processor 110 and output the haptic effect. Actuator 124 may be, for example, a piezoelectric actuator, an electric motor, an electro-magnetic actuator, a voice coil, a linear resonant actuator, a shape memory alloy, an electro-active polymer, a solenoid, an eccentric rotating mass motor, or a linear resonant actuator. The haptic effect may comprise one of several haptic effects known in the art, for example, vibrations, knocking, buzzing, jolting, or torquing the messaging device. In some embodiments, actuator 124 may comprise the same type of actuator as actuator 118. For example, each actuator may comprise an eccentric rotating mass motor. In other embodiments, actuator 118 and actuator 124 may comprise two different types of actuators. For example, actuator 118 may comprise a linear resonant actuator and actuator 124 may comprise an eccentric rotating mass motor.

In some embodiments, the first haptic effect, output by actuator 118, and the second haptic effect, output by actuator 124, are configured, when combined, to form a single haptic effect. For example, each haptic effect may comprise vibrations that when combined form harmonics that simulate a texture on the surface of touch-sensitive interface 114. In other embodiments, the two haptic effects may be felt separately. For example, one of the haptic effects may comprise a vibration configured to simulate the texture of grass on the surface of touch-sensitive interface 114. And the second haptic effect may comprise a pulsing vibration to configured to simulate the texture of pebbles or other material in the grass.

Figure 6A:
FIG. 6a is an illustration of one of the textures that may be realized using multiple actuators according to one embodiment of the present invention.

FIG. 6a is an illustration of one of the textures that a messaging device may simulate according to one embodiment of the present invention. The embodiment shown in FIG. 6a comprises brick. The texture of brick is characterized by the rough irregular texture of bricks, punctuated with the feel of gritty valleys from the mortar. In some embodiments, a system for using multiple actuators to realize textures may simulate the texture of brick by driving a first actuator, such as a linear resonant actuator, a linear piezoelectric actuator, or a fixed piezo electric actuator, with a random signal with medium to high maximum variance while the user's finger is moving. In some embodiments, this variance may be adjusted for a different roughness. In such an embodiment, the transition from brick to mortar may be simulation by a second actuator. For example, by a high-duration pop created by an eccentric rotating mass motor. Additionally, if the mortar is thick enough, a fine texture may be rendered in the section of the display associated with the mortar by driving the first actuator with a lower-magnitude signal with a higher variance than that used to drive the actuator outputting the texture of the brick.

Figure 6B:
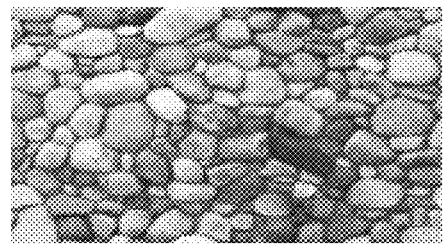
FIG. 6b is another illustration of one of the textures that may be realized using multiple actuators according to one embodiment of the present invention.

FIG. 6b is an illustration of one of the textures that a messaging device may simulate according to one embodiment of the present invention. The embodiment shown in FIG. 6b comprises rocks. The texture of rocks is characterized by smooth surfaces punctuated with transitions as the user moves from rock to rock. In some embodiments, a system for using multiple actuators to realize textures may simulate the texture of rocks, by driving a first actuator, such as a fixed piezoelectric actuator, with a haptic signal configured to create patches of low-friction on the display. In such an embodiment, individual rocks may be rendered by a non-visual edge map of the displayed image, and outputting a high-magnitude haptic signal to a second actuator, such as a linear piezoelectric actuator or eccentric rotating mass motor, when the touch-sensitive interface detects the user's movement. For example, outputting the haptic effect whenever the touch-sensitive interface detects that the user's finger is transitioning from one rock to another.

Figure 6C:
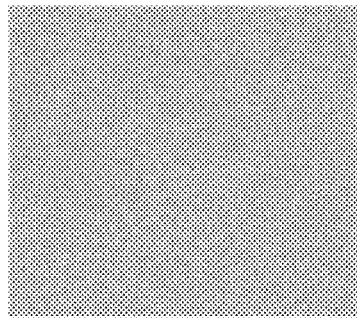
FIG. 6c is another illustration of one of the textures that may be realized using multiple actuators according to one embodiment of the present invention.

FIG. 6c is an illustration of one of the textures that a messaging device may simulate according to one embodiment of the present invention. The embodiment shown in FIG. 6c comprises sand or sandpaper. Sand is characterized by a rough, gritty feel as well as the sensation a pile of sand particles building up in front of the user's finger. In some embodiments, a system for using multiple actuators to realize textures may simulate the texture of sand by driving a first actuator such as a linear resonant actuator, a linear piezoelectric actuator, or a fixed piezoelectric actuator with a random signal with high maximum variance while the user's finger is moving. In some embodiments, the processor may adjust the variance of the signal to create different degrees of roughness. To simulate the feeling of sand piling up, the system may use a second actuator, such as a fixed piezoelectric actuator. In such an embodiment, when user moves his/her finger across the touch screen, the processor drives the actuator with a signal that starts with a low-intensity and builds as the user moves his/her finger in one direction.

In another embodiment, the texture shown in FIG. 6c may comprise sandpaper. Sandpaper is characterized by having a rough, gritty feel. In some embodiments, a system for using multiple actuators to realize textures may simulate the rough, gritty feel by transmitting a first haptic signal with high maximum variance to a first actuator, such as a linear resonant actuator, a linear piezoelectric actuator, or a fixed piezoelectric actuator. In some embodiments, this signal is output only while the user's finger is moving across the surface the touch-sensitive interface. In some embodiments, the processor may adjust the variance of the signal to change the level of roughness.

Figure 6D:
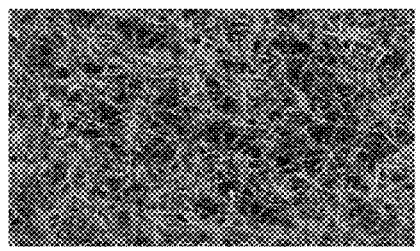
FIG. 6d is another illustration of one of the textures that may be realized using multiple actuators according to one embodiment of the present invention.

FIG. 6d is an illustration of one of the textures that a messaging device may simulate according to one embodiment of the present invention. In the embodiment shown in FIG. 6d, the texture comprises the texture of grass. Grass is characterized by a periodic light sensation that almost tickles the user's finger. In some embodiments, a system for using multiple actuators to realize textures may simulate the texture of grass by transmitting a first haptic signal to a first actuator, such as a fixed piezoelectric actuator, configured to create patches of low-friction overlaid with patches of grass. In some embodiments, the processor may render individual grass blades by driving a second actuator, such as a linear piezoelectric actuator or LRM, with a non-visual edge map of the displayed image.

Figure 6E:
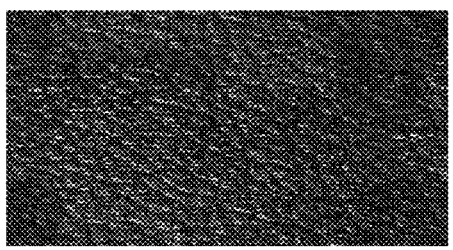
FIG. 6e is another illustration of one of the textures that may be realized using multiple actuators according to one embodiment of the present invention.

FIG. 6e is an illustration of one of the textures that a messaging device may simulate according to one embodiment of the present invention. In the embodiment shown in FIG. 6e the texture comprises the texture of leather. Leather is characterized by an overall smooth feeling that comprises the bumps and valleys of the surface of the leather. In some embodiments, a system for using multiple actuators to realize textures may simulate the texture by transmitting a first haptic signal to a first actuator, such as a fixed piezoelectric actuator, configured to output a haptic effect that reduces friction as the user's finger moves across the surface of the touch-sensitive interface. The processor may simulate the cracks and bumps in the surface of the leather by driving a second actuator with very short low-magnitude haptic signals at times when the touch-sensitive interface detects that the user's finger is moving across the leather.

Figure 6F:
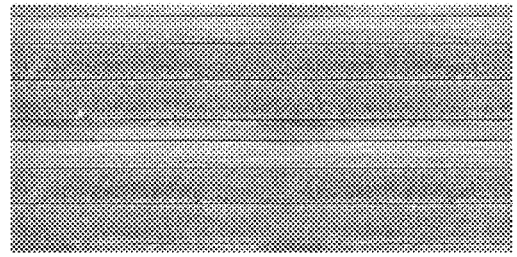
FIG. 6f is another illustration of one of the textures that may be realized using multiple actuators according to one embodiment of the present invention.

FIG. 6f is an illustration of one of the textures that a messaging device may simulate according to one embodiment of the present invention. In the embodiment shown in FIG. 6f, the texture comprises the texture of wood. Wood may be characterized by an irregular bumpy texture punctuated by a sharp transition as the user moves from board to board. In some embodiments, a system for using multiple actuators to realize textures may simulate the irregular bumpy texture by driving a first actuator such as a linear resonant actuator, a linear piezoelectric actuator, or a fixed piezoelectric actuator with a non-visual edge map of the displayed image, and further drive the first actuator with a very short low-magnitude signal at various times when the user's finger is moving. To output the transition from plank to plank, the processor may output a second haptic signal configured to cause a second actuator to output a high-magnitude, short duration, pop.

In other embodiments, haptic effects associated with different textures may be output. For example, in one embodiment, the processor may transmit haptic signals configured to cause the actuators to output haptic effects configured to simulate a texture associated with the texture of ice. Ice is characterized by low-friction, in some embodiments, ice has a completely smooth texture. In other embodiments, ice comprises a fine low-magnitude gritty texture. In some embodiments, a system for using multiple actuators to realize textures may simulate the texture of ice by driving a first actuator with a haptic signal configured to reduce the friction on the surface of the display as much as possible. The processor may simulate imperfections or grit in the ice by driving a second actuator, such as a linear piezoelectric actuator or a linear resonant actuator, with a second haptic signal configured to cause the second actuator to output low-magnitude effects while the user moves their finger. These low-magnitude effects may be associated with imperfections or grit on the surface of the ice.

In another embodiment, the processor may drive the actuators with haptic signals configured to cause the actuator to output a haptic effect approximating the texture of lizard skin. Lizard skin is characterized by an overall smooth sensation punctuated by transitions from bump to bump on the skin. In some embodiments, a system for using multiple actuators to realize textures may simulate the texture of lizard skin by driving a first actuator with a haptic signal configured to cause the actuator simulate patches of low-friction on the touch-sensitive interface. The processor may render cracks on the surface of the skin by periodically driving a second actuator with a second haptic signal when the touch-sensitive interface detects that the user's finger is moving across its surface.

In yet another embodiment, the processor may drive the actuators with haptic signals configured to cause the actuator to output a haptic effect approximating the texture of fur. Fur is characterized by a periodic light sensation that is very soft to the touch. In some embodiments, a system for using multiple actuators to realize textures may simulate the texture of fur by driving a first actuator with a first haptic signal configured to cause the first actuator to output a haptic effect configured to reduce the friction the user feels on the surface of the touch-sensitive interface. The processor may further render individual hairs by driving a second actuator with a second haptic signal comprising low-magnitude pulsing signals. In some embodiments, the processor will output the second haptic signal only when the touch-sensitive interface detects the user's movement.

In yet another embodiment, the processor may drive the actuators with haptic signals configured to simulate the texture of metal. Metal is characterized by a smooth low-friction surface that, in some embodiments, includes light grit. In some embodiments, a system for using multiple actuators to realize textures may simulate the texture metal by driving the first actuator with a signal configured to lower the friction the user feels on the surface of the touch-sensitive interface. In some embodiments, the processor may render individual bumps by driving a second actuator with a second haptic signal comprising brief high-magnitude haptic signals. In some embodiments, the processor will output the second haptic signal only when the touch-sensitive interface detects that the user is moving over its surface.

Advantages of Systems and Methods for Using Multiple Actuators to Realize Textures There are many advantages of systems and methods for using multiple actuators to realize textures. For example, systems and methods for using multiple actuators to realize textures adds a previously unused haptic effect to a mobile device. This new effect provides a new avenue for the user to receive information from the messaging device, without the user having to look at the display of the messaging device. For example, systems and methods for using multiple actuators to realize textures may allow the user to assign different textures to different icons, buttons, or other components of their display. Thus, the user may be able to determine which icon they are touching, without having to look at that icon. This may increase usability of the device, and may make a device more useful to the visually impaired.

Further, systems and methods for using multiple actuators to realize textures enable a device to render a texture with lower speed and possibly cheaper actuators. For example, using multiple actuators allows the processor to output a more intense effect if both actuators are driven with the same haptic signal at the same time. Further, the frequency with which haptic effects may be changed is increased because one of the actuators may be driven with a haptic effect while the remaining actuators is reset. This reduces the likelihood that haptic effects output by an actuator will run together. In addition, the multiple actuators may be mounted to multiple locations on the messaging device, thereby allowing haptic effects to be output on multiple locations on the messaging device.

Further, systems and methods for using multiple actuators to realize textures may provide the user with more information, without distracting the user from other tasks. Therefore, it may reduce the likelihood of user error. For example, users will be less likely to hit the wrong icon or press the wrong key if they are utilizing systems and methods for using multiple actuators to realize textures. This functionality may serve both to increase user satisfaction and increase the adoption rate for technology that incorporates systems and methods for using multiple actuators to realize textures.

General Considerations

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed is:

1. A system comprising:
    a first actuator configured to receive a first haptic signal and output a first haptic effect based at least in part on the first haptic signal;
    a second actuator configured to receive a second haptic signal and output a second haptic effect based at least in part on the second haptic signal, wherein the first haptic signal is different from the second haptic signal; and
    a processor configured to:
        determine a composite haptic effect generated by combining two haptic effects, the composite haptic effect configured to simulate a texture;
        after determining the composite haptic effect, determine a first frequency at which to operate the first actuator to output the first haptic effect and a second frequency at which to operate the second actuator to output the second haptic effect, the first and second haptic effects configured, when output at overlapping time periods to generate the composite haptic effect, wherein the first haptic effect and the second haptic effect comprise different haptic effects; and
        transmit the first haptic signal to the first actuator and transmit the second haptic signal to the second actuator.

2. The system of claim 1, wherein the texture comprises a vibrotactile effect.

3. The system of claim 1, wherein the first actuator and the second actuator comprise different types of actuators.

4. The system of claim 1, wherein the first actuator comprises an eccentric rotating mass actuator.

5. The system of claim 4, wherein the eccentric rotating mass actuator is configured to output a low-frequency haptic effect.

6. The system of claim 1, wherein the second actuator comprises a linear resonant actuator.

7. The system of claim 6, wherein the linear resonant actuator is configured to output a high-frequency haptic effect.

8. The system of claim 1, wherein the first actuator comprises one of: a lateral piezoelectric actuator, an electroactive polymer, or a shape memory alloy.

9. The system of claim 8, wherein the first actuator is configured to output both a low and a high-frequency haptic effect.

10. The system of claim 1, further comprising a housing.

11. The system of claim 10, wherein the housing comprises a mobile device housing.

12. The system of claim 10, wherein the housing comprises a computer monitor housing.

13. The system of claim 10, wherein at least one of the first actuator and the second actuator is coupled to the housing.

14. The system of claim 1, wherein the processor is further configured to:
    receive a display signal comprising a plurality of pixels; and
    determine the first haptic effect and the second haptic effect based at least in part on the display signal.

15. The system of claim 14, further comprising a display configured to receive the display signal and output an image based at least in part on the display signal.

16. The system of claim 15, wherein the texture is configured to be felt on a surface of the display.

17. The system of claim 15, wherein at least one of the first actuator or the second actuator is coupled to the display.

18. The system of claim 1, further comprising a touch-sensitive interface in communication with the processor, the touch-sensitive interface configured to detect a user interaction and transmit an interface signal associated with the user interaction to the processor.

19. The system of claim 18, wherein the haptic effect is based at least in part on the interface signal.

20. A method for outputting haptic textures comprising:
determining a composite haptic effect generated by combining two haptic effects, the composite haptic effect configured to simulate a texture;
after determining the composite haptic effect, determining a first frequency at which to operate a first actuator to output a first haptic effect and a second frequency at which to operate a second actuator to output a second haptic effect, the first haptic effect and the second haptic effect, when output at overlapping time periods, configured to generate the composite haptic effect;
transmitting a first haptic signal associated with the first haptic effect to the first actuator configured to receive the first haptic signal and output the first haptic effect; and
transmitting a second haptic signal associated with the second haptic effect to the second actuator configured to receive the second haptic signal and output the second haptic effect, wherein the first haptic signal is different from the second haptic signal.

21. The method of claim 20, wherein the texture is configured to be felt on the surface of a touch-sensitive interface.

22. The method of claim 20, further comprising receiving a display signal comprising a plurality of pixels, and wherein determining the first haptic effect and the second haptic effect is based at least in part on the display signal.

23. The method of claim 20, further comprising, receiving an interface signal from a touch-sensitive interface configured to detect user interaction, and wherein determining the first haptic effect and the second haptic effect is based at least in part on the interface signal.

24. A system comprising:
a first actuator configured to receive a first haptic signal and output a first haptic effect based at least in part on the first haptic signal;
a second actuator configured to receive a second haptic signal and output a second haptic effect based at least in part on the second haptic signal, wherein the first haptic signal is different from the second haptic signal;
a processor configured to:
receive a display signal comprising a plurality of pixels;
determine a composite haptic effect generated by combining two haptic effects, the composite haptic effect configured to simulate a texture;
after determining the composite haptic effect, determine a first frequency at which to operate the first actuator to output the first haptic effect and a second frequency at which to operate the second actuator to output the second haptic effect, the first and second haptic effects configured, when output at overlapping time periods, to generate the composite haptic effect; and
transmit the first haptic signal to the first actuator and transmit the second haptic signal to the second actuator
a display configured to receive the display signal and output an image based at least in part on the display signal, the texture configured to be felt on the surface of the display; and
a mobile device housing configured to contain the first actuator, the second actuator, the processor, and the display.

25. A system comprising:
a first actuator configured to receive a first haptic signal and output a first haptic effect based at least in part on the first haptic signal;
a second actuator configured to receive a second haptic signal and output a second haptic effect based at least in part on the second haptic signal, wherein the first haptic signal is different from the second haptic signal; and
a processor configured to:
determine a composite haptic effect generated by combining two haptic effects, the composite haptic effect configured to simulate a texture, wherein the texture comprises a vibrotactile effect;
after determining the composite haptic effect, determine a first frequency at which to operate the first actuator to output the first haptic effect and a second frequency at which to operate the second actuator to output the second haptic effect, the first and second haptic effects configured, when output at overlapping time periods to generate the composite haptic effect; and
transmit the first haptic signal to the first actuator and transmit the second haptic signal to the second actuator.

26. The system of claim 25, wherein the processor is further configured to:
receive a display signal comprising a plurality of pixels; and
determine the first haptic effect and the second haptic effect based at least in part on the display signal.

27. The system of claim 26, further comprising a display configured to receive the display signal and output an image based at least in part on the display signal.

28. The system of claim 27, wherein the texture is configured to be felt on a surface of the display.

29. The system of claim 27, wherein at least one of the first actuator or the second actuator is coupled to the display.

* * * * *